United States Patent [19]

Yoshino

[11] 4,420,947

[45] Dec. 20, 1983

[54] HEAT PUMP AIR CONDITIONING SYSTEM

[75] Inventor: Hozo Yoshino, Tokyo, Japan

[73] Assignees: System Homes Company, Ltd.; Mitsubishi Denki Kabushiki Kaisha, both of Tokyo, Japan

[21] Appl. No.: 394,866

[22] Filed: Jul. 2, 1982

[30] Foreign Application Priority Data

Jul. 10, 1981 [JP] Japan .................... 56-106893

[51] Int. Cl.³ .................... F25B 13/00; F24J 3/02
[52] U.S. Cl. .................... 62/160; 62/228.4; 62/235.1; 62/238.6; 126/422
[58] Field of Search ........ 62/160, 204, 227, 199, 62/228 B, 228 D, 238 G, 238.7, 235.1; 237/2 B; 126/422, 433

[56] References Cited

U.S. PATENT DOCUMENTS 3,952,947 4/1976 Saunders .................... 62/238.6 X
4,283,920 8/1981 Kainuma et al. ............ 62/228 B
4,352,272 10/1982 Taplay .................... 62/235.1
4,364,237 12/1982 Cooper et al. ............ 62/228 B Primary Examiner—William E. Wayner
Attorney, Agent, or Firm—Oblon, Fisher, Spivak, McClelland & Maier

[57] ABSTRACT

A heat pump air conditioning system with an active digital control of the refrigeration cycle thereof to improve the coefficient of performance. The system can incorporate solar collectors in parallel with the outdoor heat exchanger and a water storage tank in the system to maximize the utilization of solar heating and nocturnal cooling as an additional heat source or heat sink means when such are available to further improve the coefficient of performance. The system also incorporates individual temperature control mechanisms in each room to circulate an adequate amount of water from the storage tank in accordance with the heat demand of each room, thus contributing to realization of an energy efficient central air conditioning system.

31 Claims, 22 Drawing Figures

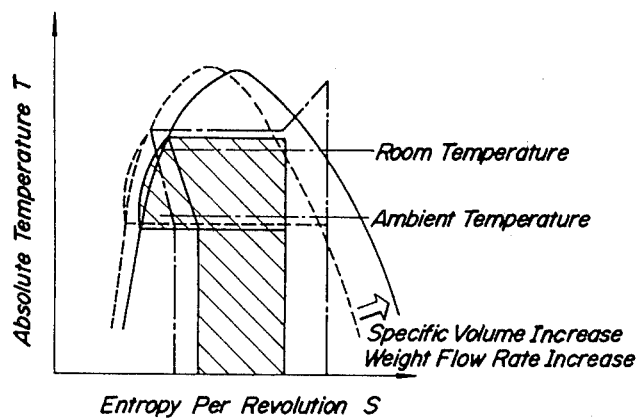
FIG_1a
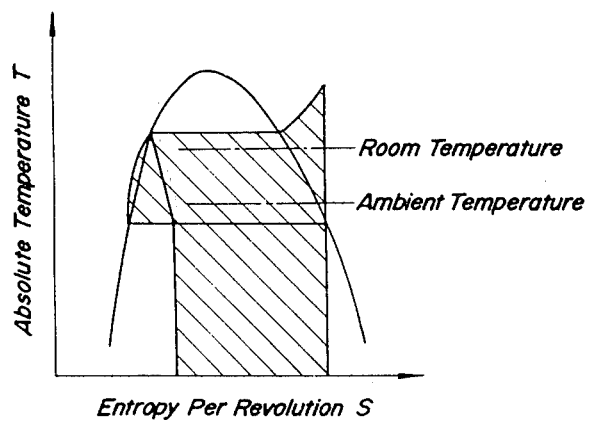
FIG_1b

FIG_3a
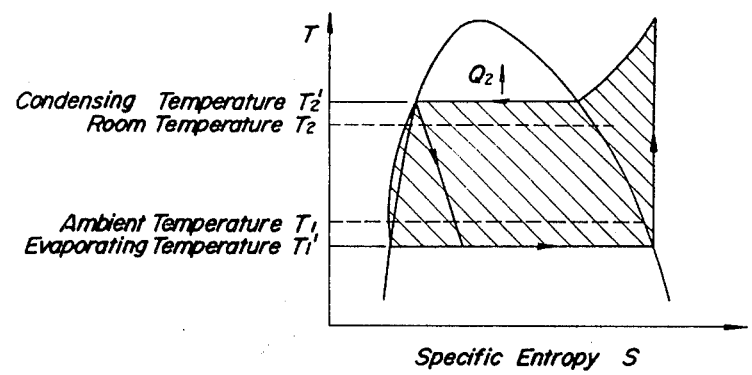
FIG_3b
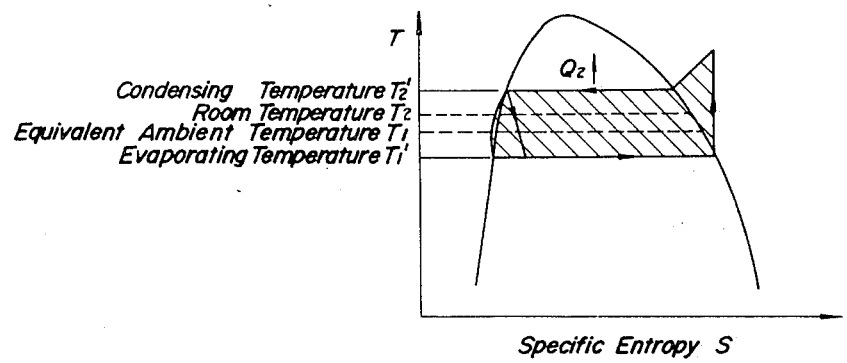

FIG_3c
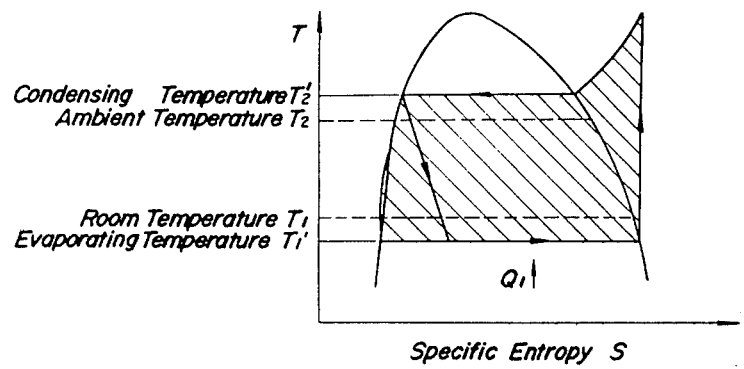
FIG_3d
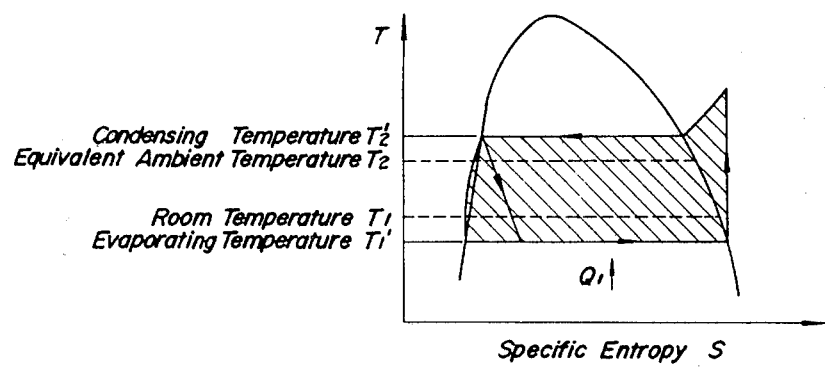

FIG_4a
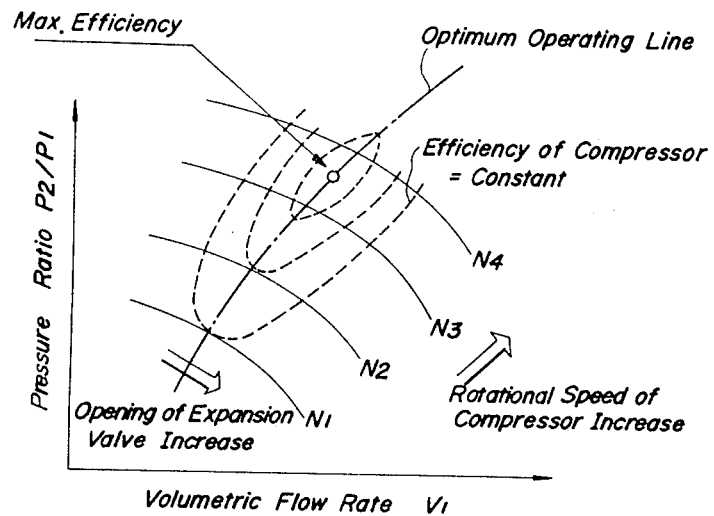
FIG_4b
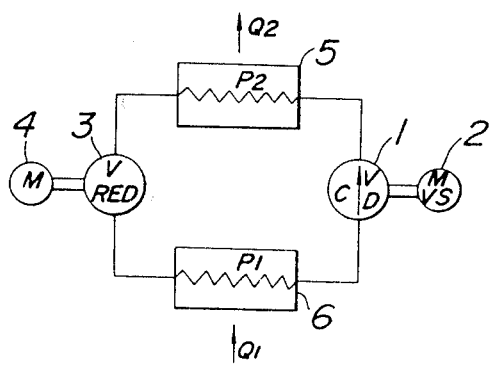

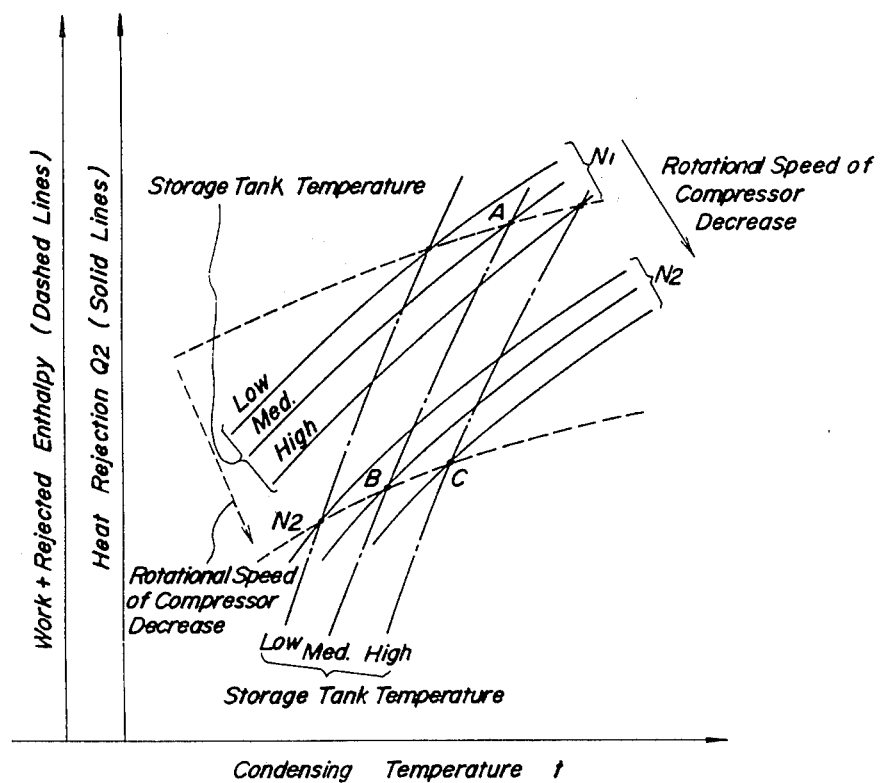
FIG_8a

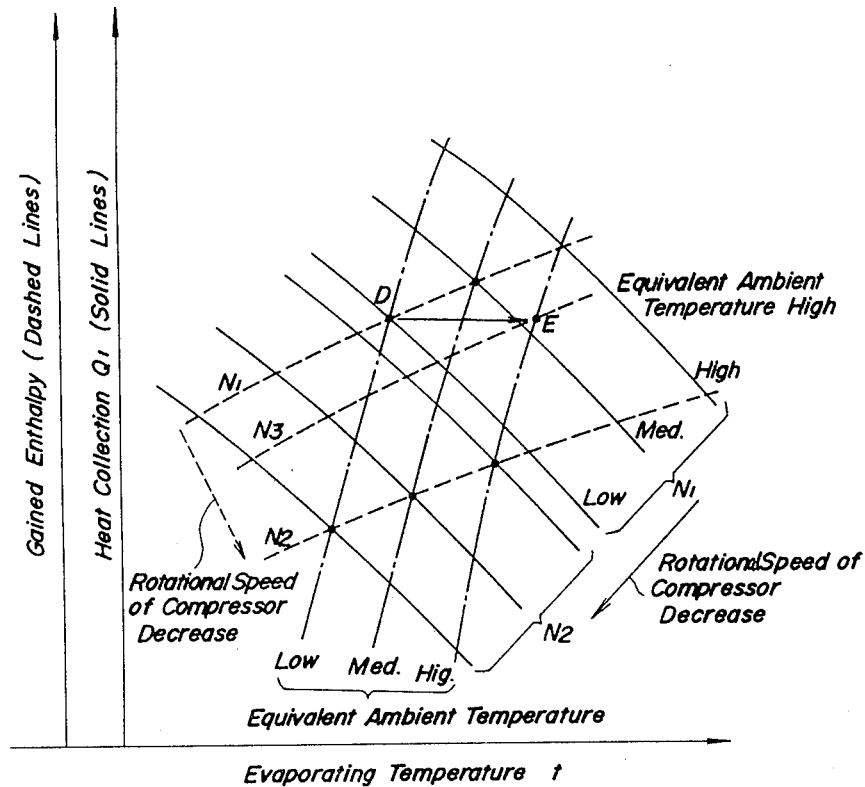
FIG_8b

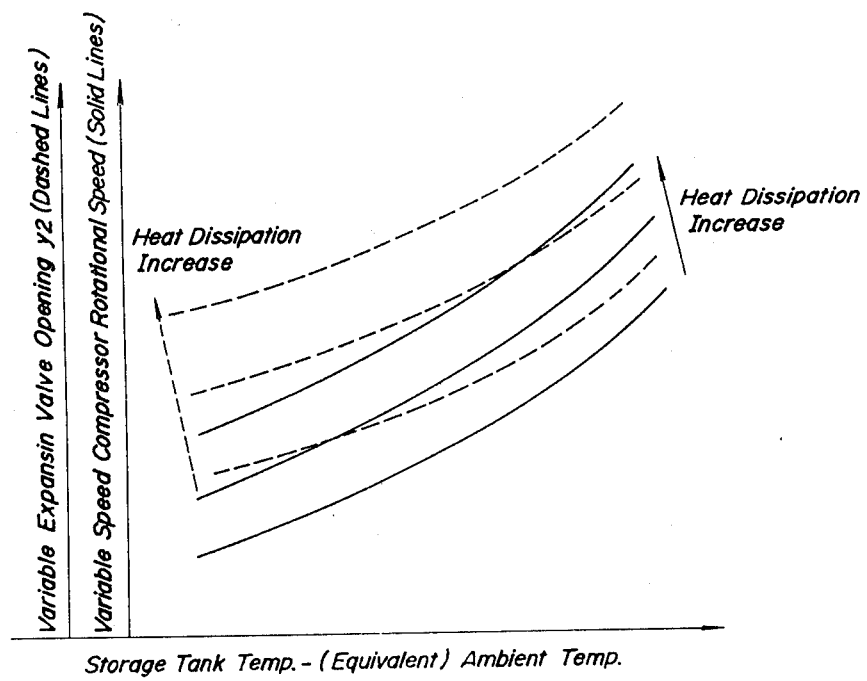
FIG_9

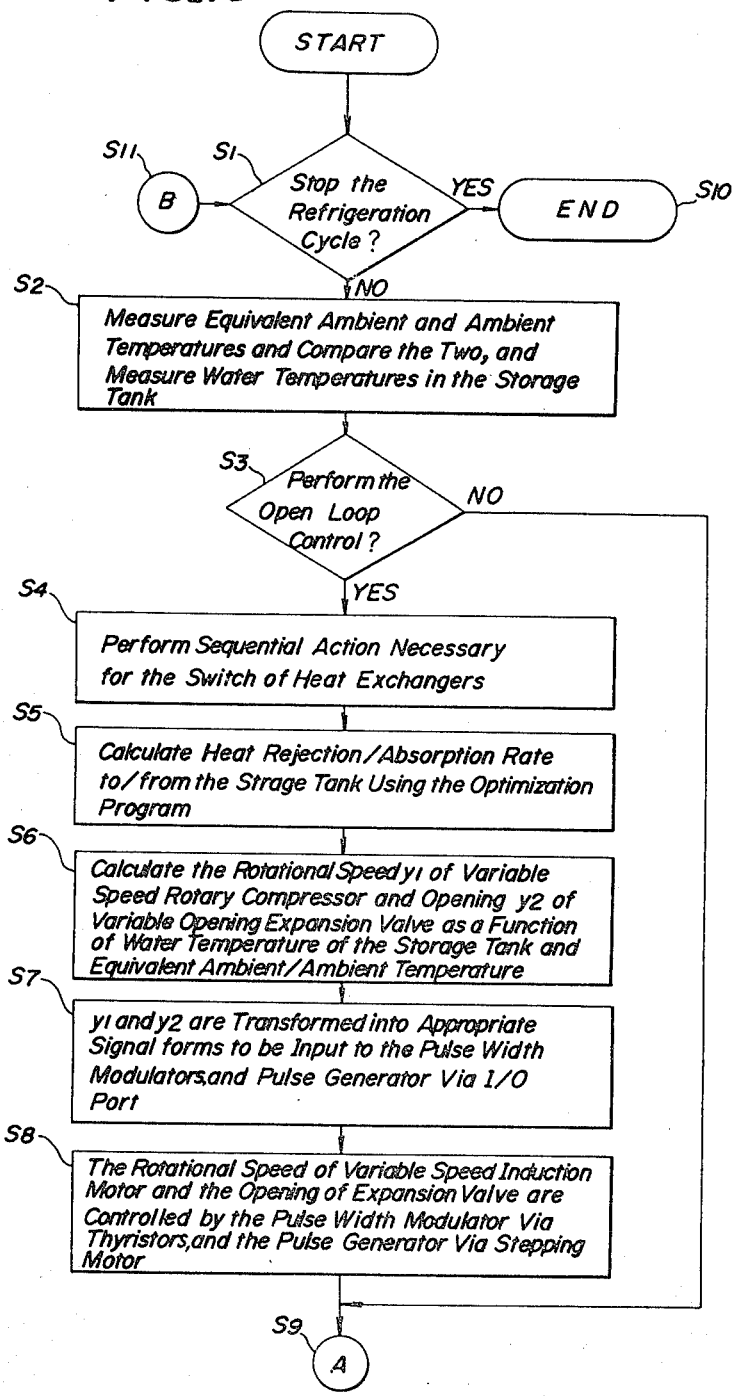

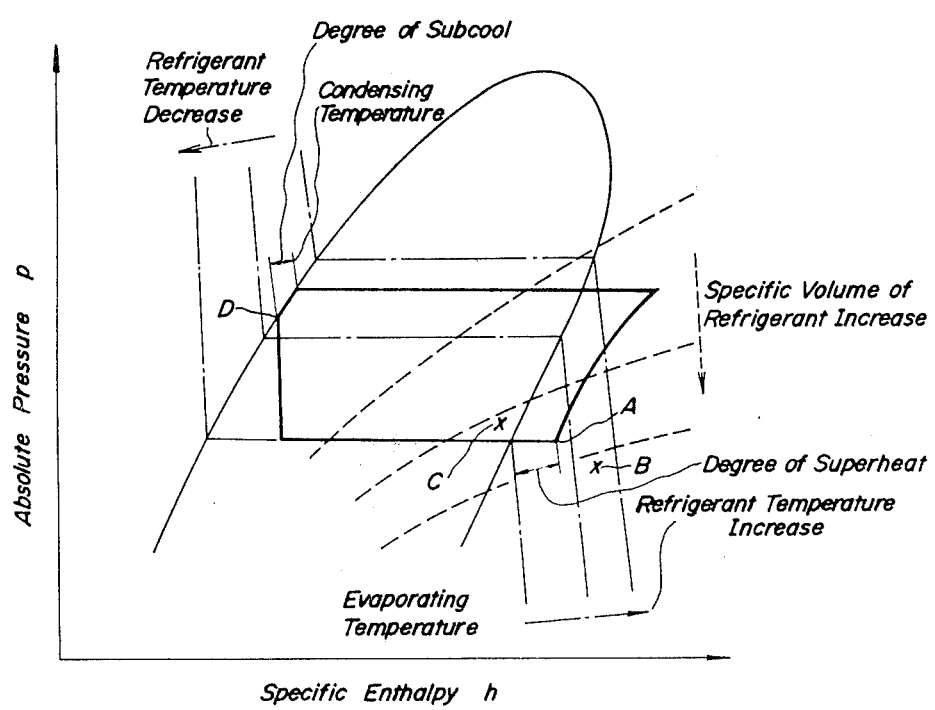
FIG_11

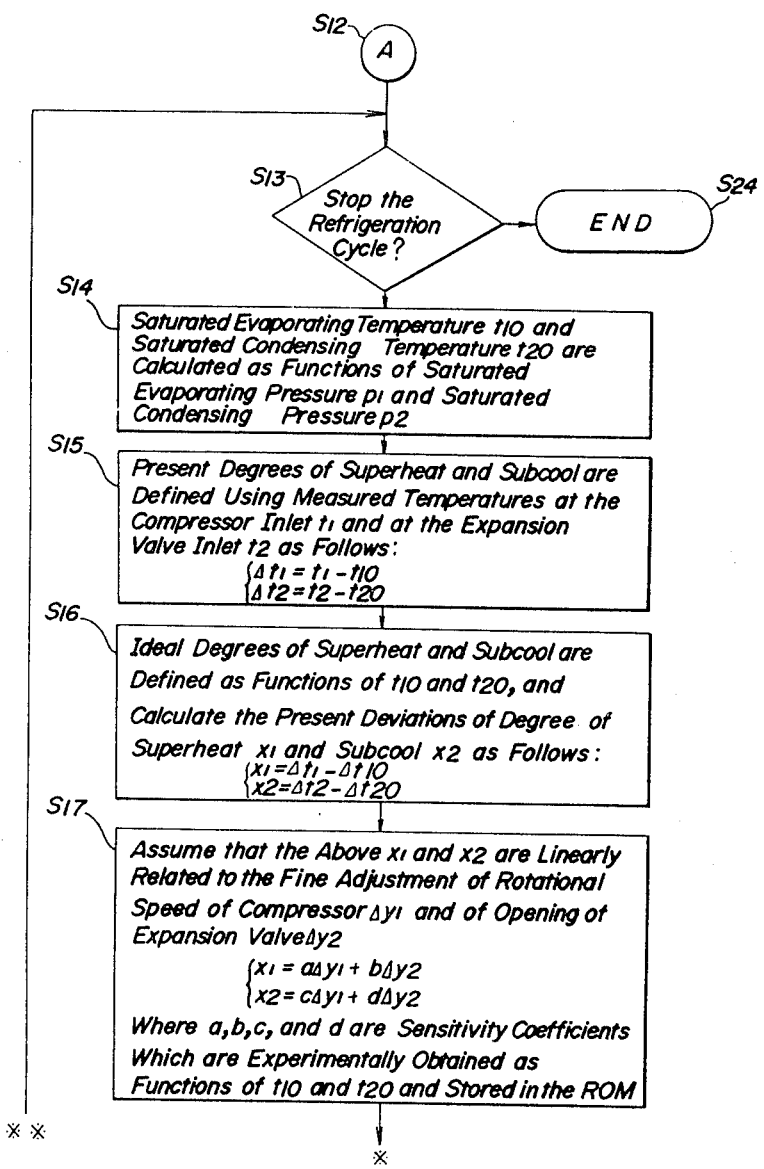

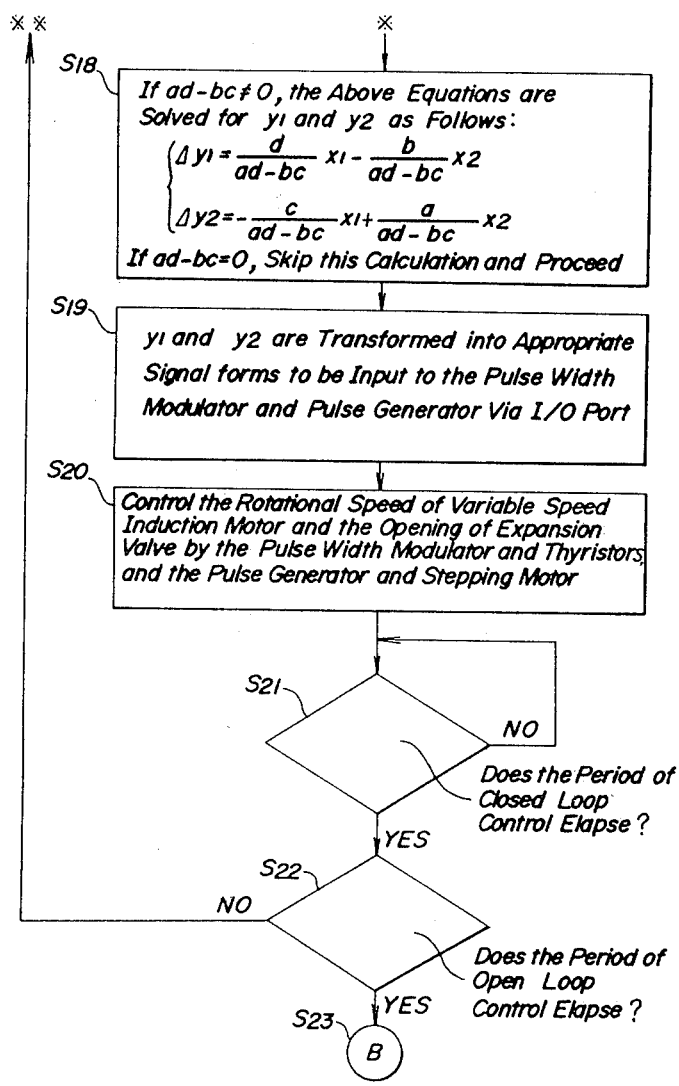
FIG_12b

HEAT PUMP AIR CONDITIONING SYSTEM

BACKGROUND OF THE INVENTION

1. Field of the Invention

The present invention relates to a heat pump air conditioning system performimg a refrigeration cycle having a compressor for compressing refrigerant, means for exchanging heat including an evaporator for evaporating the refrigerant and a condenser for condensing the refrigerant, and an expansion valve for controlling the passage of the refrigerant and more particularly to an improvement of coefficients of performance by an active control of a refrigeration cycle in the system.

2. Description of the Prior Art

Recently, keen attention has been paid to a heat pump air conditioning system for the purpose of improving energy efficiency of the air conditioning system. However, in a case, where a system is used both for a heating and cooling mode by reversing the flow direction of refrigerant back and forth, it is difficult to optimize both its coefficients of performance for the heating and cooling modes of operation, since both a temperature difference between indoor and outdoor environments and an indoor heat load vary in most cases between the two modes.

In the prior art, efforts have been made to improve the performance of both the heating and cooling modes of the heat pump air conditioning system, e.g. in U.S. Ser. No. 465,798 by Reedy et. al., by changing the placement and sizes of an expansion valve between the two modes.

In such a prior art system, however, the coefficients of performance generally tend to be lowered when the outdoor temperature becomes either too low or too high compared to a nominal design temperature, even if the coefficient of performance is maximized or optimized for the nominal indoor and outdoor temperatures and the indoor heat load at the nominal design temperature, since the opening of an expansion valve and rotational speed of a rotary compressor are almost fixed at this design condition in the prior art heat pump air conditioning system.

Recently, it has been propósed as an energy efficient air conditioning system e.g., in U.S. Pat. No. 4,246,956 to Drucker, that solar collectors be equipped in parallel with the heat pump air conditioning system. This system has tried to utilize solar radiation heat to assist the heat collection capability of an existing heat pump air conditioning system. It is, however, very difficult to continuously obtain the maximum coefficient of performance with regard to variable heat input such as solar radiation, since an opening of the expansion valve and a rotation speed of the rotary compressor are fixed and thus cannot adjust themselves to the varying environment in the above heat pump air conditioning system.

In a prior art central air conditioning system, and in particular, in a central heating system, the room temperature of a house is regulated collectively, not individually, based upon the average temperature thereof. This system has such disadvantages that unused rooms are warmed up unnecessarily, resulting in energy waste, while rooms remote from the heat source tend to have a lower temperature due to the temperature drop in the pipings, etc.

SUMMARY OF THE INVENTION

With the above in view, it is an object of the present invention to provide a heat pump air conditioning system wherein the above disadvantages are removed so that the coefficient of performance is always to be maximized by obtaining an ideal refrigeration cycle in response both to a temperature difference of indoor and outdoor environment and an indoor heat load.

It is another object of the present invention to provide a heat pump air conditioning system where the above disadvantages are deleted by utilizing solar heating as an additional heat source and to provide night sky cooling as an additional heat sink means for the heat pump air conditioning system in such a way that heat is stored temporarily in a water storage tank to be utilized for heating or cooling when the additional heat source or heat sink is not available.

It is a further object of the present invention to provide an energy efficient heat pump air conditioning system where the above disadvantages are resolved by disabling the unnecessary indoor heat exchangers individually, and circulating a correct amount of hot/cold water from the storage tank to each room based upon demands from the respective rooms.

In order to achieve the first object of the present invention, a heat pump air conditioning system according to the present invention comprises a refrigeration cycle having a compressor for compressing refrigerant, means for exchanging heat including an evaporator for evaporating the refrigerant and a condenser for condensing the refrigerant, and expansion valve for controlling the passage of the refrigerant; first means for measuring an ambient temperature; second means for measuring a temperature of the refrigerant; third means for measuring a pressure of the refrigerant; and controlling means receiving the measured data of the ambient temperature, the temperature of the refrigerant and the pressure of the refrigerant for controlling the rotational speed of the compressor and an opening of the expansion valve in accordance with the measured data to maximize a coefficient of performance of the refrigeration cycle.

In a preferred embodiment of the present invention, an opened and closed loop control of the refrigeration cycle is performed to follow a desired refrigeration cycle in the following manner. Temperature sensors are arranged in the refrigeration cycle to monitor the state variables thereof. Based on these measured state variables, real-time control of the rotational speed of the rotary compressor and the opening of the expansion valve are made continuously by processing data from the sensors by a control unit such as a microprocessor.

In another aspect of the present invention, in order to achieve the second object, there is provided a solar collector serving as a second outdoor heat exchanger in parallel with an outdoor heat exchanger such as one for an existing heat pump air conditioning system, so that this second outdoor heat exchanger is selectively used when either the solar heating or night sky cooling means is effective to collect or dissipate a correct amount of heat energy under a command from the control means to store the thus heated or cooled water temporarily in a storage tank.

More specifically, a heat pump air conditioning system according to the second aspect of the present invention comprises a refrigeration cycle having: an outdoor heat exchanger installed outdoors for exchanging heat via a refrigerant; a solar collector coupled in parallel with the outdoor heat exchanger for collecting solar energy; means for selecting either the outdoor heat exchanger or the solar collector at a time for heat transfer between the refrigerant and outdoor ambient air and/or heat radiating objects; a compressor coupled to the outdoor heat exchanger and the solar collector for compressing the refrigerant; an expansion valve coupled to the outdoor heat exchanger and the solar collector for controlling the flow rate of the refrigerant; and at least either an indoor heat exchanger installed indoors or a storage tank heat exchanger disposed in a storage tank, each of which acts as a condenser when the outdoor heat exchanger or the solar collector is used as an evaporator and acts as an evaporator when the outdoor heat exchanger or the solar collector is used as a condenser, for transferring heat between the refrigerant and indoor and outdoor air and between the refrigerant and the water in the storage tank, respectively; first means for measuring ambient temperature; second means for measuring a temperature of the refrigerant; third means for measuring the pressure of the refrigerant; and controlling means receiving the measured data of the ambient temperature, the temperature of the refrigerant and the pressure of the refrigerant for controlling the rotational speed of the compressor and an opening of the expansion valve in accordance with the measured data to maximize the coefficient of performance of the refrigeration cycle.

A heat pump air conditioning system according to the third aspect of the present invention comprises an outdoor heat exchanger installed outdoors for exchanging heat via refrigerant; a solar collector coupled in parallel with the outdoor heat exchanger for collecting solar energy; means for selecting either the outdoor heat exchanger or the solar collector at a time for heat transfer between the refrigerant and outdoor ambient air and/or heat radiating objects; a compressor coupled to the outdoor heat exchanger and the solar collector for compressing the refrigerant; an expansion valve coupled to the outdoor heat exchanger and the solar collector for controlling the flow rate of the refrigerant; a storage tank heat exchanger disposed in a storage tank which acts as a condenser when the outdoor heat exchanger or the solar collector is used as an evaporator and acts as an evaporator when the outdoor heat exchanger or the solar collector is used as a condenser, for transferring heat between the refrigerant and the water in the storage tank, the storage tank storing the water performing heat exchange with the refrigerant in the storage tank heat exchanger; and means for substituting the solar collector as an outdoor heat exchanger for the outdoor heat exchanger when it is advantageous to use the solar collector for solar heating or for night sky cooling.

In the fourth aspect of the present invention in order to achieve the third object, a heat pump air conditioning system comprises an outdoor heat exchanger installed outdoors for exchanging heat via a refrigerant; a solar collector coupled in parallel with the outdoor heat exchanger for collecting solar energy; means for selecting either the outdoor heat exchanger and the solar collector at a time for heat transfer between the refrigerant and outdoor ambient air and/or heat radiating objects; a compressor coupled to the outdoor heat exchanger and the solar collector for compressing the refrigerant; an expansion valve coupled to the outdoor heat exchanger and the solar collector for controlling the flow rate of the refrigerant; a storage tank heat exchanger disposed in a storage tank which acts as a condenser when the outdoor heat exchanger or the solar collector is used as an evaporator and acts as an evaporator when the outdoor heat exchanger or the solar collector is used as a condenser, for transferring heat between the refrigerant and the water in the storage tank, the storage tank storing the water performing the heat exchange with the refrigerant in the storage tank heat exchanger; a variable speed circulation pump for pumping out the water at a constant pressure; a solenoid valve positioned indoors for interrupting the flow of or allowing water flow from the variable speed circulation pump; a flow control valve for regulating the circulation rate of the water flow; an indoor heat exchanger for performing heat transfer between the indoor air and the water flow; and means for controlling the variable speed circulation pump, the solenoid valve, and the flow control valve in response to an indoor heat demand to introduce an appropriate amount of the water flow into the indoor heat exchanger.

Preferably, a circulation pump with a variable rotational speed is disposed in a bus piping, between the storage tank and individual room heat exchangers in various rooms. Flow control valves are disposed at the inlets to the individual room heat exchangers. The room temperature can be controlled individually by supplying a correct amount of hot or cold water from the storage tank in response to a heat demand from an individual room.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIGS. 1a, 1b and 1c are system diagrams for comparing the amounts of dissipating heat energy as a function of an ambient temperature;

FIGS. 3a, 3b, 3c and 3d are T-S diagrams illustrating that a coefficient of performance of the refrigeration cycle is improved by utilizing solar heating and night sky cooling;

FIG. 4a is diagram explaining that both a rotational speed of a compressor and an opening of an expansion valve are controlled to optimize the compression ratio of the compressor and the volumetric flow rate of the refrigerant for the improvement of the coefficient of performance;

FIG. 4b is a block diagram schematically showing a fundamental arrangement of a heat pump air conditioning system according to the present invention;

FIGS. 8a and 8b present graphs to be used in obtaining heat equilibrium points in the high- and low-pressure sides of the refrigeration cycle;

FIG. 9 is a graph illustrating that a rotational speed of a variable speed rotary compressor and an opening of a variable opening expansion valve are open loop controlled as functions of a temperature difference between the water temperature of the storage tank and an equivalent ambient temperature or ambient temperature, and a heat flow rate to the water storage tank in the heating mode;

FIG. 10 is a flow chart of the open loop control;

FIG. 11 is an explanatory diagram for explaining the degree of superheating and subcooling by superimposing them on the p-h diagram;

FIGS. 12a and 12b are flow charts of the closed loop control; and

DETAILED DESCRIPTION OF THE PREFERRED EMBODIMENTS

Figure 1C:
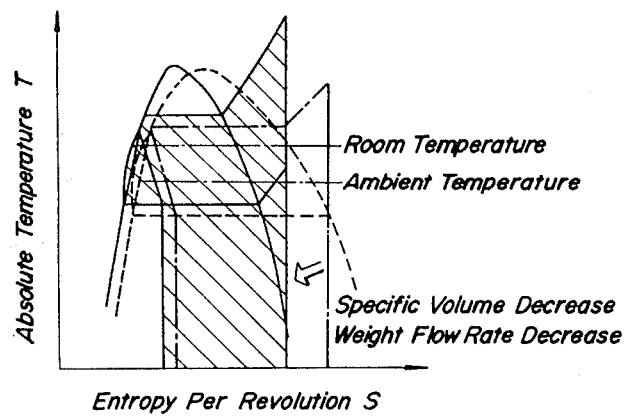

As mentioned earlier, the coefficient of performance of the heat pump air conditioning system tends to be lowered when an ambient temperature is either too low or too high compared to a nominal ambient temperature. This is because the refrigeration cycle is not optimized with regard to three major variables, i.e., a power input to the heat pump air conditioning system, a heat transfer capability of a refrigerant and a heat transfer rate between the air/water and the refrigerant.

The above phenomena will be discussed in greater detail in the following explanation, using FIG. 1, for a heating mode of operation. Assume that the room temperature is fixed, and that the rotary compressor and expansion valve respectively have a constant rotational speed and fixed opening. Power input to the compressor per revolution is given by the following equations when the compression process is ideally characterized as adiabatic;

$$N = \dot{V}_1 P_1 \frac{n}{n-1} \left\{ \left( \frac{P_2}{P_1} \right)^{\frac{n-1}{n}} - 1 \right\} \quad (1)$$

$$= \dot{W} \frac{\overline{R}}{m} T_1 \frac{n}{n-1} \left\{ \left( \frac{P_2}{P_1} \right)^{\frac{n-1}{n}} - 1 \right\} \quad (2)$$

where, $\dot{W}$: weight flow rate, $\dot{V}_1$: volumetric flow rate at the compressor inlet, $P_1$: absolute pressure at the compressor inlet, $T_1$: absolute temperature at the compressor inlet, $P_2$: absolute pressure at the compressor outlet, n: adiabatic coefficient, $\overline{R}$: universal gas constant, and m: molecular weight of the refrigerant.

It can be noted from equation (1) that the power input to the compressor per revolution is proportional to the product of the compressor suction pressure and suction volume. The heat distribution capability of the refrigeration cycle to individual rooms will now be discussed for cases of a nominal ambient temperature, a lower ambient temperature, and a higher ambient temperature.

When the ambient temperature is nominal, the refrigeration cycle becomes as depicted in FIG. 1b, in which the cross hatched area represents the heat distribution rate of the refrigeration cycle into individual rooms. It is noted in this case that the available entropy differential of the cycle is fully utilized by the refrigerant.

However, when the ambient temperature is lower, as shown in FIG. 1a, relative to the nominal temperature, the temperature gradient between the ambient air and the refrigerant becomes too small to fully vaporize the refrigerant in the evaporator at this pressure ratio. The compressor then would intake wet vapor. The corresponding T-S diagram becomes wider in shape, as shown in FIG. 1a, representing the increased weight flow rate of the refrigerant due to the specific volume decrease of the refrigerant. In this case, however, only a fraction of the entropy differential available for this cycle is utilized and a part of the power input to the compressor is lost to only circulate dummy liquid refrigerant in the refrigeration cycle. The heat distribution rate of the refrigeration cycle into the individual rooms is shown by the cross hatched area in FIG. 1a and is less than that of FIG. 1b shown superimposed on FIG. 1a by dot and dash lines. In addition, such disadvantages exist that the compressor would intake wet vapor, and the efficiency of the compressor tends to degrade for this condition.

The existing heat pump air conditioning system therefore often needs assistance from an auxiliary heat source such as electric resistance heat when the outdoor temperature gets cold.

When the ambient temperature gets high relative to the nominal temperature, as shown in FIG. 1c, the temperature gradient between the ambient air and the refrigerant becomes so large that the refrigerant fully vaporizes and is further superheated in the evaporator at this pressure ratio. The corresponding T-S diagram becomes slimmer in shape as shown in FIG. 1c, representing the reduced weight flow rate of the refrigerant due to the specific volume increase of the refrigerant. The heat distribution rate of the refrigeration cycle into the individual rooms is shown by the cross hatched area in FIG. 1c and is less than that of FIG. 1b shown by the dot and dash line in FIG. 1c. This is apparent from equation (2), since the weight flow rate of the refrigerant $\dot{W}$ decreases as the absolute temperature of the refrigerant at the compressor inlet $T_1$ increases while the power N to the compressor is held constant. In addition, the compressor efficiency degrades due to overheating and, consequently, the useful life time of the compressor would be shortened.

It is thus concluded from the above reasoning and equation (2) that an optimum pressure ratio, or an optimum rotational speed of the compressor should exist for a fixed opening of the expansion valve to maximize the coefficient of performance of the refrigeration cycle, should the temperature difference of the indoor and outdoor environments, and the weight flow rate of the refrigerant be given. It will now be explained that an apparent ambient temperature rises in the heating mode when a solar collector is installed as an outdoor heat exchanger. The heat collection rate per unit area $\dot{q}$ of the solar collector is given by the following equation (3).

$$\dot{q} = aI - k(t_1' - t_1) \quad (3)$$

where, a: solar absorption coefficient of the solar collector, I: solar radiation rate per unit area, k: heat conduction coefficient from the solar collector to surrounding atmosphere $t_1'$: temperature of the refrigerant (evaporating temperature of the refrigerant), and $t_1$: ambient temperature.

It is assumed that $t_1' > t_1$, and the second term of the right side of equation (3) represents the heat loss by convection from the refrigerant to surrounding atmosphere.

Equation (3) could be converted to as, $$q = k(t_{1e} - t'_1) \quad (4)$$

Equating equations (3) and (4), and solving for $t_{1e}$ gives, $$T_{ie} = (a/k)I + t_1 \quad (5)$$

Equation (4) assumes that the amounts of heat transfer as given by equation (3) are made solely by heat convection from a fictitious ambient atmosphere to the refrigerant. Hereafter $t_{1e}$ is used to represent the effective ambient temperature which is typically higher in value than the ambient temperature and corresponds approximately to the temperature of the solar collector in use. When the solar collector is used, it is apparent from equation (4) that the lower the temperature of the refrigerant, the more heat can be transferred into the system. With this in view, in the present preferred embodiment, a solar radiation energy is collected at a lower temperature by utilizing a latent heat energy of the refrigerant.

In the case of the cooling mode, the night sky radiation is made from the solar collector during clear summer time. The effective ambient temperature $t_{1e}$ for this case is similarly defined; i.e., the temperature is typically lower than the ambient temperature and corresponds approximately to the temperature of the solar collector in use. The detailed derivation of the effective ambient temperature is not given here for the cooling mode.

Having recognized the fact that the effective ambient temperature is higher (or lower) than the ambient temperature when the solar collector is used, it is necessary to explain the reason why the coefficient of performance improves when the solar collector is used as the "second" heat exchanger.

Figure 2:
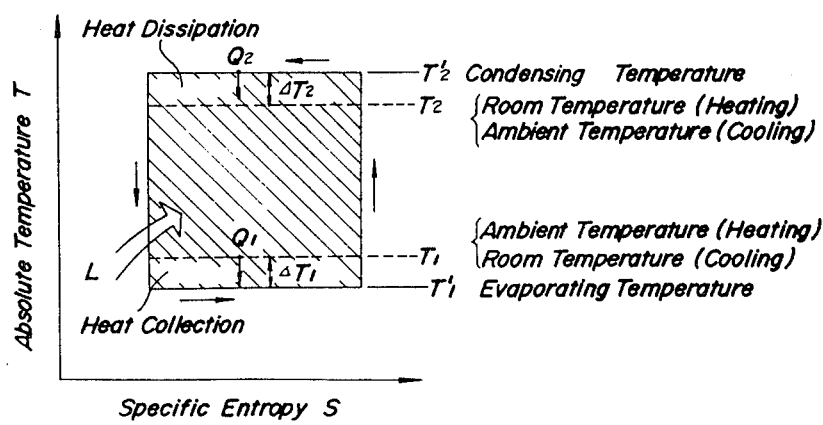
FIG. 2 is a T-S diagram of a reverse Carnot cycle representing an ideal refrigeration cycle.

FIG. 2 is the T-S diagram of a reverse Carnot cycle of refrigeration which provides the maximum heat transfer capability. $Q_1$ and $Q_2$ are the heat transferred into and out of the cycle, respectively, and L is the power input to the reverse Carnot cycle per unit refrigerant weight flow which is indicated in FIG. 2 by the area enclosed by cross hatched lines.

The following equations define the coefficients of performance $\phi_H$ and $\phi_C$, respectively for the heating and cooling modes of the reverse Carnot cycle:

$$\phi_H = \frac{Q_2}{L} = \frac{T_2}{T_2 - T_1} = \frac{T_2 + \Delta T_2}{(T_2 + \Delta T_2) - (T_1 - \Delta T_1)} \quad (6)$$

$$= \frac{T_2}{T_2 - T_1} \cdot \frac{1 + \frac{\Delta T_2}{T_2}}{1 + \frac{\Delta T_1 + \Delta T_2}{T_2 - T_1}}$$

$$\approx \frac{T_2}{T_2 - T_1} \left( 1 - \frac{T_1 \Delta T_2 + T_2 \Delta T_1}{T_2(T_2 - T_1)} \right)$$

$$\phi_C = \frac{Q_1}{L} = \frac{T_1}{T_2 - T_1} \quad (7)$$

$$\approx \frac{T_2}{T_2 - T_1} \left( 1 - \frac{\Delta T_1}{T_1} - \frac{\Delta T_1 + \Delta T_2}{T_2 - T_1} \right)$$

To improve the coefficients of performance, it is apparent from equations (6) and (7) that the temperature difference of the cycle, $T_2 - T_1$ should be small, heat rejection should be made at a high temperature $T_2$, and the temperature gradient $\Delta T_1$, and $\Delta T_2$ necessary for the heat transfer should be small.

For example, if the coefficient of performance of the existing heat pump air conditioning system with $t_1 = -15°$ C.($T_1 = 258°$ K.) and $t_2 = 35°$ C. ($T_2 = 308°$ K.) offers 3.5, then the present invention with the effective ambient temperature of 15° C.($T_1 = 288°$ K.) would provide the coefficient of performance of about 8.8. This figure was calculated by substituting the corresponding numerical values of $T_1$ and $T_2$ into equation (6), taking the ratio of the coefficient of performance of the present invention over the existing system, and multiplying the ratio by the coefficient of performance of the existing heat pump air conditioning system, i.e., 3.5. It was assumed that $\Delta T_1 = \Delta T_2 = 0$.

The T-S diagrams of FIGS. 3a and 3b compare the actual refrigeration cycle for the existing heat pump air conditioning system to that of the present invention with solar collector. It is noted from the figure that the power input to the compressor is greatly reduced by using solar radiation for given heat rejection rate $Q_2$. The power input to the compressor is represented in the T-S diagram by the cross hatched area around which the refrigeration cycle takes place. The T-S diagrams of FIGS. 3c and 3d are for the cooling mode. The actual refrigeration cycle of the existing heat pump air conditioning system is compared to that of the present invention with the solar collector. By utilizing nocturnal cooling, the condensating temperature of the present invention is lowered for a given heat collection rate $Q_1$, compared to the existing system, thus improving the coefficient of performance.

Whenever either the additional heat source of heat sink is available, the rotational speed of the rotary compressor could be reduced to lower the pressure ratio for a given heat load.

The preferred embodiment adaptively varies the pressure ratio of the refrigeration cycle in accordance with its environment to improve the coefficient of performance. Turning now to FIGS. 4a and 4b wherein a relationship between the pressure ratio and the volumetric flow rate of the refrigerant is illustrated, as shown in FIG. 4a, there exists a volumetric flow rate of the refrigerant which would maximize the efficiency of the rotary compressor at a given pressure ratio. These points for different pressure ratios can be linked together to form the optimum operating line as shown by a dash and dot line in FIG. 4a. To bring the operating point of the refrigeration cycle on this line, the volumetric flow rate of the refrigerant must be controlled as well as the pressure ratio. Therefore, as illustrated in FIG. 4b, both the rotational speed of a rotary compressor 1 and the opening of a variable expansion valve 3 are continuously controlled on a real-time basis. A refrigeration cycle is so realized that the coefficient of performance at a given operating condition approaches or is substantially equal to its maximum valve. In FIG. 4b, the rotational speed of the compressor 1 is varied by a motor 2 and the opening of the expansion valve 3 is also varied by a motor 4 to obtain the most optimum operating point mentioned above. In this manner, both a heat exchanger 5 on a high temperature side and a heat exchanger 6 on a low temperature side can be operated in an ideal fashion.

In a conventional heat pump air conditioning system, heat distribution into and heat absorption out of individual rooms is done typically by switching the compressor on and off, because the rotary compressor has a fixed rotational speed and the expansion valve has an almost fixed opening. Therefore, the refrigeration cycle is not optimized in accordance with the temperature difference of indoor and outdoor environments, and a cyclic variation of room temperatures can exist.

Now, the heat pump air conditioning system of the present invention tries to utilize solar heating and night sky cooling as additional heat transfer means, the temperature of the heated or cooled water in the storage tank is not necessarily constant. The room temperature, however, is desired to be kept at an approximately constant level, so that the temperature gradient varies between the water in the storage tank and the air in the room. This gradient can be compensated for by varying the rotational speed of circulation pump and by metering of individual flow control valve at the inlet of the indoor heat exchanger in each room, thus a fine adjustment of the room temperature can be made individually in response to heat demand of each room, without on-off control of the compressor.

In a preferred embodiment of the present invention, efforts have been made to maximize the coefficient of performance in the upstream side of the water storage tank by collecting or dissipating the heat energy as much as possible and in the downstream side by properly distributing the heat energy stored in the storage tank to respond to the heat demand from the individual rooms. In this manner, a very efficient heat pump air conditioning system is realized.

When the ambient temperature is getting lower, the conventional heat pump air conditioning system has such problems as degradation of the start-up characteristics of the system and a poor heat conduction characteristic of the outdoor heat exchanger due to the accumulation of frost on the surface of heat exchanger, necessitating an intermittent interruption of the heating mode for defrosting, and causing discomfort to persons in the room. These problems are alleviated by the preferred embodiment because a storage tank is installed between the refrigeration cycle and the water distribution network and the open and closed loop control of the refrigeration cycle is performed on a continuous basis.

Turing now to a block diagram shown in FIG. 5, explanation will be made of the overall arrangement of an embodiment of an air conditioning system according to the present invention.

"Freon" is used as the refrigerant for this air conditioning system. The solar collector 30 and the outdoor heat exchanger 32 are connected in parallel. A variable speed rotary compressor 34 compresses low pressure refrigerant vapor into high pressure vapor, and a variable opening expansion valve 36 controls the pressure differential across the valve 36 for a given flow rate of the refrigerant. A water storage tank 38 is thermally insulated and stores heated or cooled water at a preprogrammed temperature which will be explained later. A storage tank heat exchanger 40 is installed inside the water storage tank 38 and performs heat transfer between the refrigerant and heated or cooled water in the storage tank 38.

A variable speed circulation pump 42 takes out heated or cooled water in the storage tank 38 from a water exit port 44, to conduct the water into the indoor heat exchanger where heat is rejected or absorbed, and returns it back to a water entrance port 48. A reservoir 50 is installed just dowstream of the variable opening expansion valve 36 to separate liquid refrigerant from the heat exchanger on a high temperature side from vapor refrigerant not liquefied and to store excess liquid refrigerant which is not in use.

The reservoir 50 also absorbs, redistributes, and stores excess refrigerant when the operation mode is transferred such as from the solar collector 30 to the outdoor heat exchanger 32 or from the heating to cooling mode, etc.

The present embodiment has four operational modes; i.e., heating, cooling, solar collector transfer, and outdoor heat exchanger transfer modes of operation.

Solenoid valves 56, 58, 60 and 62 are activated or deactivated to select the solar collector 30 or the outdoor heat exchanger 32. Check valves 64, 66, 68 and 70 are connected in parallel with the solenoid valves 56, 58, 60, and 62, respectively, and bypass the refrigerant to recover it from the heat exchangers not in use at the time of switching the operation mode. A four-way valve 72 on the compressor side and a four-way valve 74 on the expansion valve side are utilized to change the flow direction of the refrigerant in accordance with the heating mode or the cooling mode.

Each room is equipped with a solenoid valve 78. Whenever the room needs air conditioning, cooled water is delivered into each room under the command of the solenoid valve 78 of which position is selected manually by a room switch 99. A flow control valve 79 regulates the flow rate of heated or cooled water into each room in accordance with the heat demand of that room.

A solar collector pressure transducer 80, an outdoor heat exchanger pressure transducer 82, and a storage tank heat exchanger pressure transducer 84 measure the saturated vapor pressure of the refrigerant inside the respective heat exchangers. A variable speed circulation pump pressure transducer 85 measures an outlet pressure of the variable speed circulation pump 42. These transducers in this embodiment are of strain gauge type and are utilized as safety sensors for over-pressurization as well. The pressure transducer 80 or 82, and the pressure transducer 84 sense high and low saturated evaporating pressures, respectively, which can be translated into the saturated evaporating temperature and saturated condensing temperature as functions of the respective saturated evaporating pressure.

A temperature sensor 86 on the inlet side of the variable speed compressor 34 and a temperature sensor 88 on the inlet side of the variable opening expansion valve 36 respectively measure the outlet temperatures of the heat exchangers on a low temperature side and a high temperature side. The temperatures thus measured are then used along with the saturated evaporating temperature mentioned above to calculate the degree of superheating and subcooling which will be described later.

A solar collector temperature sensor 90 measures the equivalent ambient temperature mentioned earlier, and its output is used with the output of an ambient temperature sensor 92, attached to the outdoor heat exchanger 32, to determine if the solar collector 30 could be used instead of the outdoor heat exchanger 32.

A storage tank temperature sensor 94 measures the temperature of heated or cooled water in the storage tank 38, and a room temperature sensor 96 measures the temperature inside each room.

In the present embodiment, a thermister may be used as the temperature sensor. A room temperature setting dial 98 can be manipulated to preset the room temperature at a desired level. A room air conditioning switch 99 controls the solenoid valve 78 to conduct the heated or cooled water into only the desired rooms.

A stepping motor 100 continuously varies the opening of the variable opening expansion valve 36, and a variable speed induction motor 102 continuously varies the rotational speed of the variable speed rotary compressor 34.

Similarly, a stepping motor 104 and a variable speed induction motor 106 continuously control the opening of the flow control valve 79 and the rotational speed of the variable speed circulation pump 44.

Reference numeral 110 denotes a control unit. In response to the status of the console switches 76 and the data obtained from the various pressure transducers 80, 82, 84 and 85 and the temperature sensors, 86, 88, 90, 92, 94 and 96 etc., the control unit 110 performs such functions as selection of the operation mode, switching of each valve, measurement and control of the rotational speed of the variable speed induction motors 102 and 104 and opening of the variable opening expansion valve 104.

The control unit 110 and the associated devices are described in detail hereinafter by referring to the block diagram of FIG. 6. As shown in the diagram the control unit 110 is located inside the dashed lines and is connected to the associated devices shown located outside the dashed lines. The inputs to the control unit 110 are described first.

For instance, the signal obtained from the pressure tranducer 80 is voltage amplified and impedance transformed by the signal conditioner provided in the pressure transducer 80 and then is transferred to the control unit 110. The signals obtained from other pressure transducers and temperature sensors are similarly processed to be transferred to the control unit 110. These signals are sampled in turn by an analog multiplexer 120 to be received by a sample-holder 121. An analog multiplexer 120 and the sample-holder 121 receive the control signals on a control bus 144 from a microprocessor 126 via an I/O port 124.

LSI (large-scale integrated circuit) 6502 may be used as the microprocessor 126. A clock generator 127 having a crystal oscillator supplies a predetermined clock signal to the microprocessor 126. The analog signal from the sample-holder 121 is then transferred to an A/D converter 122 to be transformed to an 8-bit digital signal, and then transferred to the I/O port 124. The A/D converter 122 receives the control signal on the data bus 144 from the microprocessor 126 via the I/O port 124. 6520 of LSI is used for the I/O port 124. The data received via the I/O port 124 are routed through an 8-bit data bus 140 to RAM 128 for storage. The necessary data stored in the RAM 128 can be accessed by specifying its address from the microprocessor 126 via a 16-bit address bus 142. The data are sent to the microprocessor 126 via the data bus 140 under the direction of a program written and stored on the ROM 130. The microprocessor 126 performs necessary arithmetic operations. The results of the arithmetic operations are transferred to the individual devices from the I/O port 124 through the data bus 140. This output operation is performed with the control signals on the control bus 144 which are sent from the mircoprocessor 126 to the I/O port 124. The 2714 and 2716 of LSI may be used for the RAM 128 and the ROM 130, respectively.

The output signals are processed to be supplied to each control device in the following manner. The driving signals of thyristors 154 and 164 are obtained from pulse width modulators 150 and 160 of which signals have variable pulse repetition periods and variable duty cycles. The driving signals of the stepping motors 100 and 106 are obtained from pulse generators 170 and 180 of which signals have pulse trains of variable number of pulses. The rectifiers 152 and 162 rectify and smooth out the line voltage to supply outputs thereof to the thyristors 154 and 164, where the direct currents are chopped into square waves by the control signals from the pulse width modulators 150 and 160. The variable speed induction motors 102 and 104 are thus controlled their rotational speeds. The pulse generators 170 and 180 issue signals for driving the stepping motors 100 and 106 to control the openings of the variable opening expansion valve 36 and the flow control valve 79.

The operation of the heat pump air conditioning system of the preferred embodiment can be categorized into five groups: (1) selection of either the heating or cooling mode and start-up of the system, (2) selection of either the solar collector or outdoor heat exchanger and the switching therebetween, (3) an open loop control of the system, (4) a closed loop control of the system, and (5) heat distribution and absorption control into and out of each room.

These operations are further described as follows.

Figure 5:
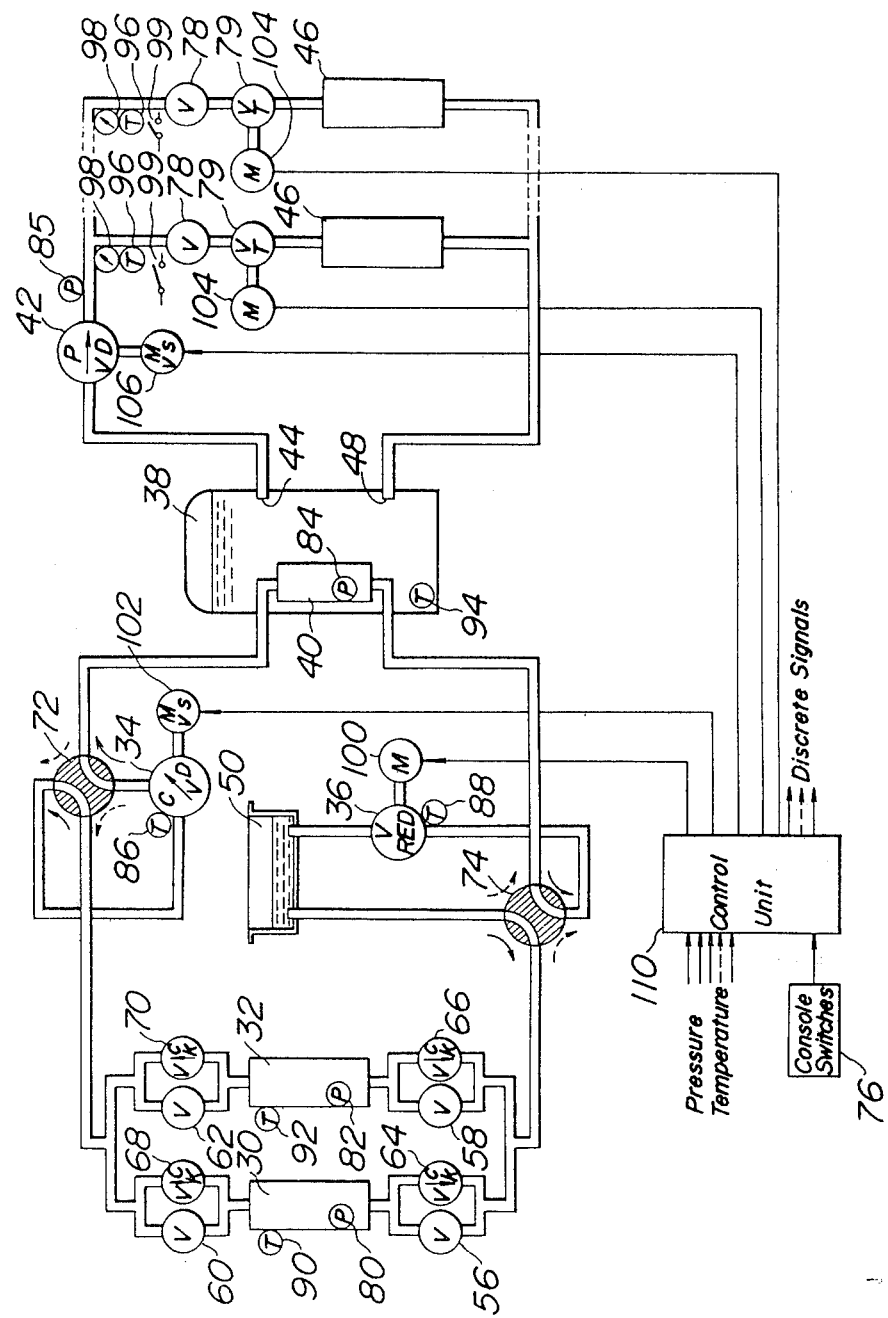
FIG. 5 is a block diagram schematically showing a preferred embodiment of a heat pump air conditioning system according to the present invention.

The manual switches on the operator's console 76, as shown in FIG. 5, are manipulated to select this system out of heating, cooling, and non-use modes of operation.

Should the heating mode be selected, the four-way valve 72 on the compressor side and the four-way valve 74 on the expansion valve side are switched to the position as indicated in FIG. 5, and the refrigerant will flow in the direction shown by the solid arrows. This corresponds to the heating mode of operation. For cooling mode, the four-way valves 72 and 74 will be switched to the position indicated by the dashed arrows in FIG. 5.

Whenever the heat pump air conditioning system is started up, the heating mode must be selected first. The solenoid valves 56, 58, 60 and 62 are all shut down and the variable speed rotary compressor 34 is started.

Consequently, residual refrigerant stored in the solar collector 30 and the outdoor heat exchanger 32 is directed to the reservoir 50 through the check valve 74. Since the solenoid valves 56 and 53 are shut down, the refrigerant will not flow through the expansion valve 36. Therefore, the pressure inside the reservoir 50 builds up, so that the gaseous refrigerant is liquefied in the reservoir 50. Here, when a pressure on the high pressure side obtained from the storage tank pressure transducer 84 builds up beyond a predetermined value, a steady operating mode is entered into by opening appropriate solenoid valves, depending upon whether solar collector 30 or outdoor heat exchanger 32 is used.

These operations are performed automatically by the microprocessor 126 in the control unit 110.

The selection of the heat exchangers and the switching therebetween will be discussed next.

It is important to determine which one of the solar collector 30 and outdoor heat exchanger 32 is to be selected for the improvement of the coefficient of performance in both the heating and cooling modes.

Therefore, in order to select either one of the heat exchangers, a comparison of the outputs is made between the solar collector temperature sensor 90 attached to the solar collector 30 and the ambient temperature sensor 92 attached to the outdoor heat exchanger 32 by the microprocessor 126 in the control unit 110.

The temperature of the solar collector 30 is increased by solar heating. i.e. if there is sunshine during cold winter time. Consequently, the equivalent ambient temperature indicated by the solar collector temperature sensor 90 is higher than the ambient temperature measured by the ambient temperature sensor 92.

On the other hand, the temperature of the solar collector 30 is cooled down by the night sky radiation during clear summer time. Therefore, the equivalent ambient temperature indicated by the solar collector temperature sensor 90 is lower than the ambient temperature measured by the ambient temperature sensor 92.

Depending upon whether a temperature difference between the equivalent ambient temperature and the ambient temperature exceeds a predetermined value, and whether this situation continues for a certain period of time, the two heat exchangers 30 and 32 would be switched under the control of the microprocessor 126. This switching, however, has one associated problem in that an amount of refrigerant in the refrigeration cycle tends to decrease, if the refrigerant remains in the unused heat exchanger.

It is desirable, therefore, before switching of the heat exchangers, to pump out the refrigerant from both the solar collector 30 and the heat exchanger 32 to recover the refrigerant into the reservoir 50.

A similar procedure as described in the start-up operation is followed for this reason. The heating mode is selected first for the heat pump air conditioning system, the solenoid valves 56, 58, 60, and 62 are all shut down, and the variable speed rotary compressor 34 is then started. Consequently, the refrigerant in the heat exchangers 30 and 32 flows through the check valves 68 and 70 via the four-way valve 74 on the expansion valve side into the reservoir 50.

As the pressure in the storage tank heat exchanger 40 is building up, the gaseous refrigerant will be liquefied in the reservoir 50. When the pressure indicated by the storage tank pressure transducer 84 exceeds a preset value, the solenoid valve of the desired heat exchanger is opened to start a steady operation of either heating or cooling mode.

Now, the open loop control of the heat pump air conditioning system will be explained.

One purpose of the open loop control is to provide strategies in the collection of external heat or dissipation of internal heat in the form of a programmed control of the heat pump air conditioning system. Programmed control of heating and cooling is performed based on the prediction of weather and heat load for a relatively long period of time, such as one to several days.

To satisfy the heat collection or dissipation requirement by utilizing additional heat source or heat sink of solar irradiance or night sky radiation is closely related to maximize the integral coefficient of performance of the system for a period of one to several days.

However, if the water temperature in the storage tank gets too high (or too low), the heat convection increases from the surface of the storage tank to ambient atmosphere. Therefore, it is necessary to determine the optimum time history of the water temperature in the storage tank, namely, the optimum time history of the heat transfer to or from the storage tank, for a period of one day, for instance. For this purpose, a full-scale experiment and a simulation would be necessary using known heat source, heat sink and heat load.

The details of the program of heat collection or dissipation for maximizing the coefficient of performance is not discussed here. It is noted, however, that the program should consist of a simple control law and it can be updated automatically in a few seconds to adapt promptly to environmental variations.

Explanation is now made of the operations of the open loop control. To help understand the operation, the equilibrium condition of a refrigeration cycle is discussed first referring to the first law of thermodynamics. A match is assumed to exist here between the rotational speed of the compressor and the opening of the expansion valve. How to go about matching these two devices will be discussed later.

Figure 7A:
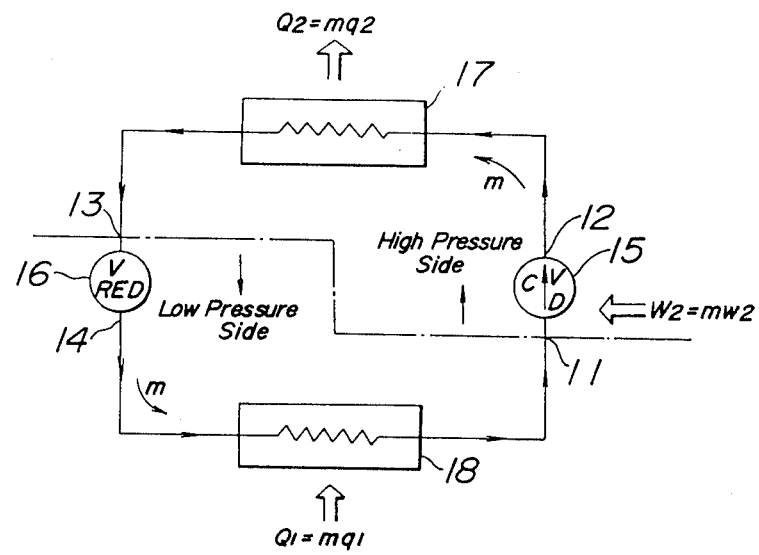
FIGS. 7a and 7b are respectively a block diagram and the corresponding p-h diagram for explaining the refrigeration cycle by dividing the cycle into high- and low-pressure sides for convenience.
Figure 7B:
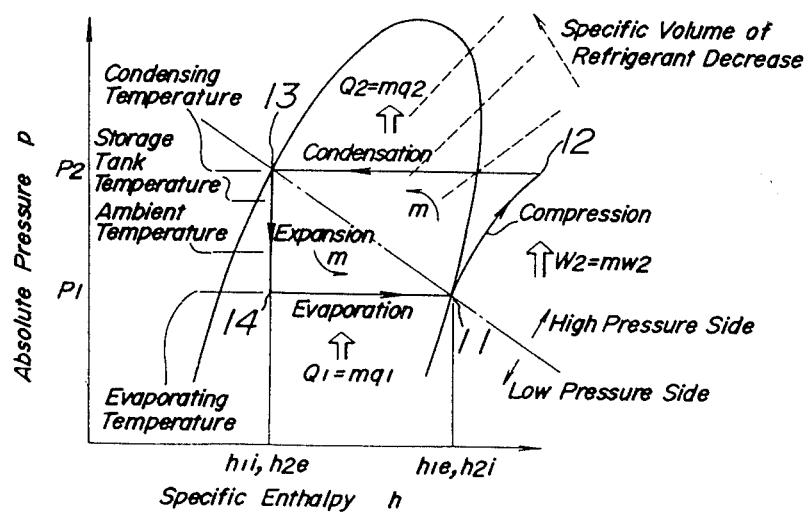

FIGS. 7a and 7b show as an example a system diagram and the p-h diagram of an ideal refrigeration cycle for an ideal heating mode. For convenience, the fluid system is subdivided into two open systems as shown in FIG. 7a. The high pressure side is from the inlet 11 of the compressor 15 to the inlet 13 of the expansion valve 16. The low pressure side is from the inlet 13 of the expansion valve 16 to the inlet 11 of the compressor 15. Reference numeral 12 denotes the outlet of the compressor 15, 14 the outlet of the expansion valve 16, 17 a condenser, and 13 an evaporator. Since the system involved is an ideal system, the pressure loss and temperature drop in the pipings, etc. will not be considered here. Also the kinetic and potential energies are neglected, since they are small.

The following equation can be applied to each open system, using the first law of thermodynamics below:

$$Q - W = m_e h_e - m_i h_i + \dot{U} \tag{8}$$

where, Q: heat energy rate into system, W: thermal equivalent of mechanical work done by the system to the outer world, $m_e$: weight flow rate of the refrigerant at exit from the system, $m_i$: weight flow rate of the refrigerant at inlet to the system, $h_e$: specific enthalpy of the refrigerant at exit from the system, $h_i$: specific enthalpy of the refrigerant at inlet to the system, and $\dot{U}$: rate of increase of internal energy of the system.

When dealing with a steady flow condition, the flow rate of the refrigerant is constant throughout the system, i.e.

$$m = m_e = m_i \tag{9}$$

The internal energy of the system U is also constant, consequently, $$\dot{U} = 0 \tag{10}$$

To apply equation (3) to the high pressure side of the system, the following variables, are defined:

$$Q = -Q_2 = -mq_2 \text{(heat rejection rate)} \tag{11}$$

$$W = -W_2 = -mw_2 \text{(thermal equivalent of work done by the compressor to the system)} \quad (12)$$

Where $q_2$ and $w_2$ are, respectively, heat rejection rate and applied work per unit weight flow of the refrigerant, then upon substituting equations (9) through (12) into equation (8), the following equation of thermal equilibrium will result with reference to FIG. 7b:

$$mw_2 + m(h_{2i} - h_{2e}) = mq_2 \quad (13)$$

The heat rejection rate $mq_2$ on the right hand side of equation (13) represents the heat transfer from the refrigerant to the water in the storage tank and is a function of the condensing temperature, the rotational speed of the compressor, and the water temperature in the storage tank as shown by the solid lines in FIG. 8a.

The left hand side of equation (13), on the other hand, implies the compressor work plus the rejecting enthalpy differential and is a function of the condensing temperature and the rotational speed of the compressor as shown by the dashed lines in FIG. 8a. The reason why the dashed lines have a positive gradient is explained as follows. When the condensing temperature increases, the specific enthalpy differential of saturated vapor and saturated liquid (i.e., the width of the saturation line in the p-h diagram) decreases slightly. However, the increase of the weight flow rate m of the refrigerant is dominant, so that the rejecting enthalpy increases. These phenomena are shown in FIG. 7b, where the specific volume of the refrigerant decreses, as the saturated vapor pressure increases, and the weight flow rate m per given rotational rate of the rotary compressor will increase.

Equation (13) represents thermal equilibrium and is satisfied at a point where the solid line and the dotted lines cross. Assuming that the water temperature of the storage tank is "medium", then referring to FIG. 8a, point A and point B can be determined as cross points corresponding to $N_1$ and $N_2$ of the rotational speeds of the compressor. The equilibrium line of the system can now be obtained by connecting point A and point B by the dash and dotted line. Similar equilibrium lines can be drawn corresponding to "high" and "low" water temperatures as depicted in FIG. 8a.

By using this equilibrium line, it is noted that the equilibrium point of rejecting energy rate $Q_2$ drops from point A to point C, when the water temperature and the rotational speed of the compressor vary from "medium" to "high", and from $N_1$ to $N_2$, respectively. When this drop occurs, the corresponding compressor work plus rejecting enthalpy also drops from point A to point C, resulting in lowering the weight flow rate m, i.e., the rotational speed of the compressor.

Referring to FIG. 8a, it is understood that if the rejecting energy $Q_2$ is given as a function of the rotational speed of the compressor and the water temperature of the storage tank, then the corresponding condensating temperature of the refrigerant is determined automatically. In other words, if two out of four variables are given, the remaining two variables are automatically determined.

Now, let equation (8) be applied to the lower pressure side of the system by assuming:

$$Q = Q_1 = mq_1 \text{(heat collection rate)} \quad (14)$$

Then the following equation is obtained by referring to FIG. 7b:

$$mq_1 = m(h_{1e} - h_{1i}) \quad (15)$$

where $q_1$ is the heat collection rate per unit weight flow of the refrigerant.

When the heat rejection rate $Q_2$ to the water storage tank in the high pressure side is determined and the rotational speed of the compressor, or the associated work $W_2$ is known, then the heat collection rate $Q_1$ in the low pressure side can be obtained by the following equation referring to FIG. 7b:

$$Q_1 = Q_2 - W_2 \quad (16)$$

Equation (16) represents the heat collection rate $Q_1 = mq_1$ in equation (15) and implies the heat transfer from the equivalent ambient atmosphere or ambient atmosphere to the refrigerant. The heat collection rate $Q_1$ is given as a function of the evaporating temperature, rotational speed of the compressor and the (equivalent) ambient temperature, as depicted by the solid lines in FIG. 8b. The left hand side of equation (15), on the other hand, represents the gained enthalpy and is obtained as a function of the evaporating temperature and the rotational speed of the compressor as depicted by the dashed lines in FIG. 8b. The reason why this graph has a positive gradient is the same as that already explained for the high pressure side of the system.

Assume now that the equivalent ambient temperature changes abruptly from "low" to "high", when the heat collection rate $Q_1$, corresponding to the value given by abscissa of point D in FIG. 8b, is required, the evaporating temperature of equilibrium then shifts from the value given by ordinate of point D to point E to obtain the same amount of heat energy. The transfer of the heat equilibrium point from point D to point E implies that reduced rotational speed ($N_3$ in this case) of the compressor compared to the original speed of $N_1$ can produce the same amount of enthalpy differential since the specific volume of the refrigerant is reduced as the evaporating temperature increases. In other words, if a variable speed compressor is used, the input power to the induction motor of the compressor can be reduced, since the driving power of the compressor is proportional to the rotational speed. If a variable torque rotary compressor is used, a smaller amount of input power is sufficient to the induction motor of the compressor per motor revolution, since the torque load of the compressor is reduced in accordance with reduced pressure differential in the refrigeration cycle. It is, therefore, understood from FIG. 8b that less power consumption is achieved when the solar heating is used, relative to the case without the solar heating, since the equivalent ambient temperature is increased to obtain the same amount of heat.

The above discussion has assumed that a match exists between the rotational speed of the compressor and the opening of the expansion valve. A discussion will now be set forth as to how to match these two devices.

When the rotational speed of the compressor is given, the volumetric flow rate of the refrigerant through the compressor can be obtained. As the specific volume of the refrigerant at the inlet port of the compressor is known, the weight flow rate m of the refrigerant can be calculated using the known compressor inlet temperature. When the saturated condensing temperature and the evaporating temperature of the refrigerant are known, the saturated vapor pressure $p_2$ on the high pressure side and the saturated vapor pressure $p_1$ on the low pressure side can be determined as shown in FIG. 7b.

Assuming that both sides of the expansion valve are filled with liquid, then the opening $A_1$ of the expansion valve must satisfy the following equation of throttling for an isenthalpic flow:

$$m_1 = C_q \epsilon A_1 \sqrt{2\gamma(p_2 - p_1)} \quad (17)$$

where, $C_q$: flow coefficient, $\epsilon$: modification constant as a function of $p_1$, $p_2$, and ratio of specific heat of the refrigerant, and $\gamma$: specific weight of the refrigerant on the high pressure side.

In an actual expansion valve, however, a part of the refrigerant is already vaporized due to a temperature decrease caused by throttling. Now if it is assumed that the pressure ratio of the high pressure side to the low pressure side is more than 2.0, and that the nozzle throat area and the low pressure side are filled with a gaseous fluid only, then the opening $A_2$ of the expansion valve must satisfy the following equation of critical flow of gas:

$$m_2 = \tau A_2 \sqrt{2g\, p_2/v_2} \quad (18)$$

where, $\tau$: constant determined from a ratio of specific heat, g: acceleration due to gravity, and $v_2$: specific volume of the refrigerant on the high pressure side.

In the actual expansion valve, however, the mixture of the refrigerant in its liquid and vapor phases exists in which flow is governed by both equations (17) and (18). The two phases are considered to be intermixing and as having friction with each other. In summary, if the rotational speed of the compressor is given for a specific condition, the weight flow rate of the refrigerant can be calculated at the inlet of the compressor, and the corresponding opening A of the expansion valve can be determined as a matched set from equations (17) and (18) or from experimental results. When the two devices are mismatched, the efficiency of the refrigeration cycle is lowered as indicated in FIG. 4a.

As mentioned earlier in relation to FIGS. 8a and 8b, the rotational speed of the compressor and the opening of expansion valve are determined when the rejecting heat energy is given in accordance with the water temperature of the storage tank and the equivalent ambient temperature or the ambient temperature. The saturated condensing temperature and the saturated evaporating temperature are also determined and the high and low saturated vapor pressures of the present heat pump air conditioning system accordingly. Therefore, the relationship mentioned above can be stored in the ROM 130 of the control unit 110 as a graphical form such as shown in FIG. 9 or a simple approximate formula such as a quadratic equation of which coefficients can be obtained from results of full-size experiment and/or simulation. The graph shown in FIG. 9 is stored in the ROM 130 and gives approximate values of the rotational speed $y_1$ of the variable speed rotary compressor 34 and the opening $y_2$ of the variable opening expansion valve, should the temperature difference between the water in the storage tank and the (equivalent) ambient temperature be known and the heat rejection rate to the storage tank be also given. This is a programmed control based on experimental results only and it is an open loop control which does not need a feedback of the state variables.

Figure 6:
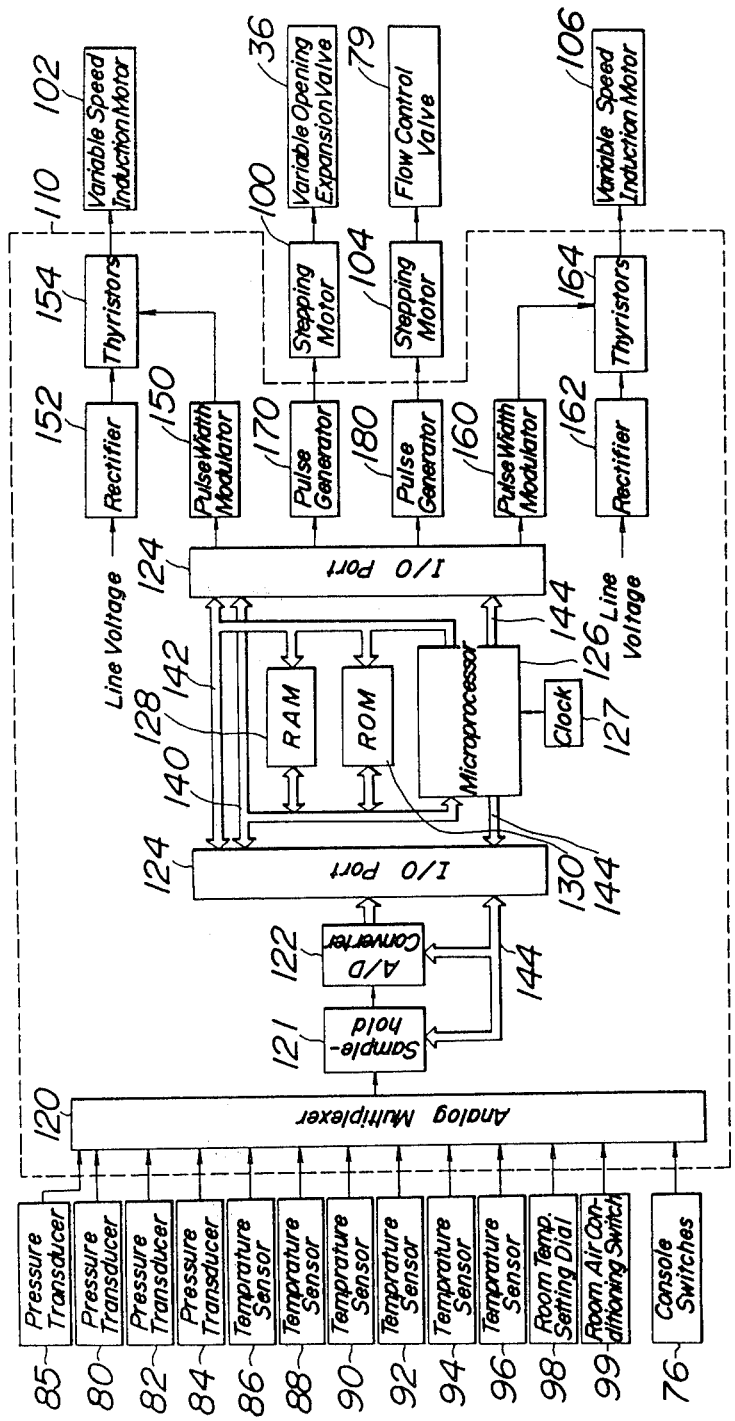
FIG. 6 is a block diagram showing the details of the control unit shown in FIG. 5.

The open loop control is now described in detail by referring to FIG. 6.

The values $y_1$ and $y_2$ read from the ROM 130 are transformed into appropriate signal forms to be received by the pulse width modulator 150 and the pulse generator 170, respectively, and then are transferred through the I/O port 124. The output from the pulse width modulator 150 is supplied to the thyristors 154, where the dc current is chopped to control the rotational speed of the variable speed induction motor 102. The rectifier 152 is installed to rectify and smooth out the line voltage to obtain a dc voltage which is supplied to the thyristors 154. The output of the pulse generator 170 is supplied to the stepping motor 100 to control the opening of the variable opening expansion valve 36.

To adapt the system to external atmospheric variations, an update is made, for example, once in five minutes to obtain an optimum heat rejection rate to the water in the storage tank 38. Rescheduling is made for both the rotational speed of the variable speed rotary compressor 34 and the opening of the variable opening expansion valve 36. This action is referred to as a major cycle compared to a minor cycle which will be described later.

One of salient features of this system is a control of the amount of heat collection or dissipation rate which has been difficult in the past. As apparent from FIG. 9, the amount is controlled by varying both the rotational speed of the compressor and the opening of the expansion valve in accordance with the temperature difference between the water temperature of the storage tank and the (equivalent) ambient temperature. The discussion has thus far focused primarily on the heating mode of operation, but it can be easily extended to the cooling mode as well.

The above process of the open loop control is explained by using the flow chart of FIG. 10. First, step 1 checks whether the refrigeration cycle is to be stopped or not, whenever the console switch 76 in FIG. 5 is "ON", step S2 is entered. Otherwise, step S10 is selected and the sequential control is initiated to stop the system and the refrigeration cycle is eventually halted.

Step S2 measures the water temperature of the storage tank 38 by the temperature sensor 94, and the equivalent ambient temperature by the solar collector temperature sensor 90 or the ambient temperature by the ambient temperature sensor 92. Step S3 checks whether the switching of heat exchangers and accompanying open loop control is necessary based upon the measured temperature difference between the collector temperature sensor 90 and the ambient temperature sensor 92. If it is determined that the switching is necessary, then step S4 is initiated to sequentially control the switching of heat exchangers. Otherwise, step S9 is entered and the closed loop control is to take place.

Step S5 then calculates the heat rejection or collection rate to or from the storage tank 38 by an optimization program. Step S6 reads data from the table lookup on the ROM 130 to calculate the rotational speed of the compressor 34 and the opening of the expansion valve 36. The calculation is based upon the temperature difference between the water temperature in the storage tank 38 and the (equivalent) ambient temperature, and the heat rejection or collection rate. Step S7 reads data from the table lookup on the ROM 130 concerning the rotational speed $y_1$ of the compressor 34 and the opening $y_2$ of the expansion valve 36. The values $y_1$ and $y_2$ are then transformed into appropriate signal forms to be supplied to the pulse width modulator 150 and the pulse generator 170 via I/O port 124. In step S8, the rotational speed of the variable speed induction motor 102 and the opening of the expansion valve 36 are controlled by the pulse width modulator 150 via the thyristors 154, and the pulse generator 170 via the stepping motor 100, respectively.

The closed loop control is now described for the heat pump air conditioning system of the present invention.

The open loop control just mentioned above controls both the pressure ratio and the volumetric flow rate based on prediction to bring both of them on or near the optimum operating line of FIG. 4a. This programmed control of the heat rejection to or collection from the storage tank is made in relation to the heat demand and weather and heat load prediction for a relatively long period of time.

By this control, the refrigeration cycle of the present air conditioning system becomes close to the ideal refrigeration cycle mentioned earlier in the diagrams of FIG. 1 and FIG. 3. The closed loop control tries to bring the refrigeration cycle of the present system to further coincide with the ideal cycle in order to maximize the coefficient of performance at the present operating point. The degree of superheating and subcooling are regarded as two major dependent state variables and the deviations of which from the ideal values are used as feedback signals in the closed loop control system. Fine control is made on the two independent control variables, i.e., the rotational speed of the compressor and the opening of the expansion valve. The degree of superheating is defined as the temperature difference between the temperature of the refrigerant at the compressor inlet and its saturated evaporating temperature in the evaporator, and the degree of subcooling is defined as the temperature difference between the temperature of the refrigerant at the expansion valve inlet and its saturated condensing temperature in the condenser.

The degree of superheating and subcooling of the refrigerant are explained in FIG. 11 by using the p-h diagram.

FIG. 11 shows an ideal refrigeration cycle denoted by a bold solid line, lines of constant specific volume denoted by dashed lines, and isothermal lines denoted by dash and dotted lines. Considering the steady state refrigeration cycle in a case where the opening of the expansion valve is relatively small with regard to a constant rotational speed of the compressor, the amount of the refrigerant supplied from the expansion valve to the evaporator is less than those taken in by the compressor from the evaporator, and the internal energy in the evaporator decreases as does the saturated evaporating temperature. As a result, the refrigerant in the evaporator is superheated due to an increase of the collected heat energy. An ideal equilibrium point A at the compressor inlet would then shift to point B as illustrated in FIG. 11. The specific volume of the refrigerant thus increases to result in a decrease of the weight flow rate of the refrigerant through the compressor at a constant speed, thereby attaining a new equilibrium condition. Therefore, the efficiency of the refrigeration cycle decreases, since the weight flow rate obtainable by the rotational speed of the compressor is less than maximum.

Considering next the refrigeration cycle in a case when the opening of the expansion valve is relatively large with regard to a constant rotational speed of the compressor, the amount of refrigerant supplied to the evaporator now increases to raise the evaporating temperature and to decrease the heat energy collected. The evaporator then tends to be filled with the liquid refrigerant, and the ideal equilibrium point A moves to point C. The specific volume of the refrigerant thus decreases resulting in an increase of the weight flow rate of the refrigerant, so that the amount of the refrigerant taken into the compressor balances with the amount of the refrigerant supplied by the expansion valve. However, the latent heat associated with this refrigeration cycle is not fully utilized, so that the heat collection capability of the system at the equilibrium condition and consequently the coefficient of performance thereof decreases.

From the discussion above, there exists an optimum degree of superheating in the heat pump air conditioning system to maximize its coefficient of performance. This condition can be satisfied by controlling relative magnitudes of the rotational speed of the compressor and the opening of expansion valve. This explanation can be applied to the equilibrium condition at the inlet of the expansion valve (point D in FIG. 11) as well, and there exists an optimum degree of subcooling there. Like in the case of superheating, this condition can also be satisfied by controlling the relative magnitudes of the rotational speed of the compressor and the opening of the expansion valve.

It will now be explained referring to the flow chart of FIGS. 12a and 12b how this closed loop control is performed of the rotational speed of the compressor 34 and the opening of the expansion valve 36 to optimize the degrees of superheating and subcooling.

The computational sequence of step S9 in FIG. 10 is succeeded by step S13 via step S12 of FIG. 12a. Step S13 checks whether the refrigeration cycle is stopped or not. If the refrigeration cycle is not to be stopped, step S14 is entered. Otherwise, step S24 is initiated, so that the sequential control is performed to stop the system, and the refrigeration cycle is eventually halted. Next, in step S14, the saturated evaporating pressure $p_1$ and the saturated condensing pressure $p_2$ are measured by the pressure transducers 80 or 82, and by the pressure transducer 84, respectively, to be stored temporarily in the RAM 128 of the control unit 110. The following functional relations, in equations (19), are defined a priori which relate the saturated evaporating temperature $t_{10}$ and the saturated condensing temperature $t_{20}$ to functions of the saturated evaporating pressure $p_1$ and the saturated condensing pressure $p_2$, respectively:

$$\left. \begin{array}{l} t_{10} = f(p_1) \\ t_{20} = f(p_2) \end{array} \right\} \quad (19)$$

These equations are memorized in the ROM 130 as a table lookup on which the saturated evaporating temperature $t_{10}$ and the saturated condensing temperature $t_{20}$ are defined to relate to the corresponding pressures $p_1$ and $p_2$ as numerical sets. By using the pressures $p_1$ and $p_2$ measured and stored in the RAM 128, the saturated evaporating temperature $t_{10}$ and the saturated condensing temperature $t_{20}$ are calculated by interpolation or extrapolation of the stored values.

The inlet temperature $t_1$ of the variable speed rotary compressor 34 and the inlet temperature $t_2$ of the variable opening expansion valve 36 are respectively measured by the temperature sensors 86 and 88 to be stored temporarily in the RAM 128. If the degrees of superheating and subcooling are denoted at present as $\Delta t_1$ and $\Delta t_2$, respectively, then these can be defined by the following formulas using the data obtained above (step 15):

$$\left.\begin{array}{l}\Delta t_1 = t_1 - t_{10} \\ \Delta t_2 = t_2 - t_{20}\end{array}\right\} \quad (20)$$

Denoting the degrees of superheating and subcooling of the ideal condition as $\Delta t_{10}$ and $\Delta t_{20}$, respectively, the deviations of the degrees of superheating $x_1$ and subcooling $x_2$ from an ideal condition can be calculated by the microprocessor 126 as follows in step S16:

$$\left.\begin{array}{l}x_1 = \Delta t_1 - \Delta t_{10} \\ x_2 = \Delta t_2 - \Delta t_{20}\end{array}\right\} \quad (21)$$

where the deviations from the ideal condition are assumed small in the refrigeration cycle under consideration. Therefore, a fine adjustment $\Delta y_1$ of the rotational speed of the variable speed rotary compressor 34 and a fine adjustment $\Delta y_2$ of the opening of the variable opening expansion valve 36 are defined, respectively, to relate linearly to the deviations of the degree of superheating $x_1$ and degree of subcooling $x_2$ as functions of the saturated evaporating temperature $t_{10}$ and the saturated condensing temperature $t_{20}$ by using the following sensitivity coefficients.

$$\left.\begin{array}{l}a = \dfrac{\partial x_1}{\partial y_1} = f_{11}(t_{10}) \\ b = \dfrac{\partial x_1}{\partial y_2} = f_{12}(t_{10}) \\ c = \dfrac{\partial x_2}{\partial y_1} = f_{21}(t_{20}) \\ d = \dfrac{\partial x_2}{\partial y_2} = f_{22}(t_{20})\end{array}\right\} \quad (22)$$

Therefore, $x_1$ and $x_2$ have the following linear relations to $\Delta y_1$ and $\Delta y_2$ which is shown step S17:

$$\left.\begin{array}{l}x_1 = a\Delta y_1 + b\Delta y_2 \\ x_2 = c\Delta y_1 + d\Delta y_2\end{array}\right\} \quad (23)$$

Equations (23) are solved $\Delta y_1$ and $\Delta y_2$:

$$\left.\begin{array}{l}\Delta y_1 = \dfrac{d}{ad-bc} x_1 - \dfrac{b}{ad-bc} x_2 \\ \Delta y_2 = -\dfrac{c}{ad-bc} x_1 + \dfrac{a}{ad-bc} x_2\end{array}\right\} \quad (24)$$

where, it was assumed that $ad - bc \neq 0$.

If $ad - bc = 0$, the calculation of equations (23) is skipped. Fine adjustment of the rotational speed $\Delta y_1$ of the variable speed rotary compressor and the opening $\Delta y_2$ of the variable opening expansion valve are calculated by the microprocessor 126 using the sensitivity coefficients a, b, c and d and the deviations of the degree of superheating $x_1$ and subcooling $x_2$ in step S18.

$\Delta y_1$ and $\Delta y_2$ thus obtained are transformed into appropriate signal forms to be supplied to the pulse width modulator 150 and the pulse generator 170, respectively. These signals are transferred from the microprocessor 126 to the pulse width modulator 150 and the pulse generator via the I/O port 124 (step S19). In step S20, the output from the pulse width modulator 150 finely controls the opening of expansion valve 36 via the stepping motor 100. This calculation and the control are performed once in every thirty seconds to one minute, which is referred to as the minor cycle. Step S21 checks whether the period of closed loop control has elapsed or not. If an elapsed period is judged to have occurred, then step S22 is entered. If not, step S21 is repeated until the elapsed period is judged to have occurred. Similar to step S21, step S22 checks whether the period of open loop control is elapsed or not. If the elapsed period is not judged to have occurred, the sequence returns to step S13. Otherwise, step S11 of the open loop control shown in FIG. 10 is reentered via step S23 to repeat the open loop control. In the cooling mode, almost the same control of the refrigeration cycle is performed as in the heating mode. Hence, further explanation will be omitted here.

In summary, an active control of the heat rejection to and collection from the water storage tank is performed in the above-described two sequences. First, in the open loop control, the magnitude of the pressure differential between the high and low saturated vapors of the refrigeration cycle is determined based on the temperature difference between the water in the storage tank and the equivalent ambient temperature or the ambient temperature, and the heat transfer rate to or from the storage tank. The corresponding rotational speed of the compressor and the opening of the expansion valve are then approximately obtained. Next, in the closed loop control, the rotational speed of the compressor and the opening of the expansion valve are finely controlled to adapt the present degree of superheating and subcooling to those of the ideal refrigeration cycle. An ideal refrigeration cycle is thus realized by the present embodiment of refrigeration cycle.

Should the pressure differential between the high and low saturated vapors on the p-h diagram and, accordingly, the rotational speed of compressor is adequately set in accordance with the surrounding conditions and also a match exists between the rotational speed of the compressor and the opening of the expansion valve, the high and low saturated vapor pressures, or the saturated condensing and evaporating temperatures as a pair shift up and down automatically on the p-h refrigeration diagram until they settle down to an equilibrium condition, in response to the heat input and output rate.

Thus, the heat pump air conditioning system of the present invention can be regarded as an adaptive model follower system which seeks an ideal model of the refrigeration cycle on the p-h diagram.

Figure 13:
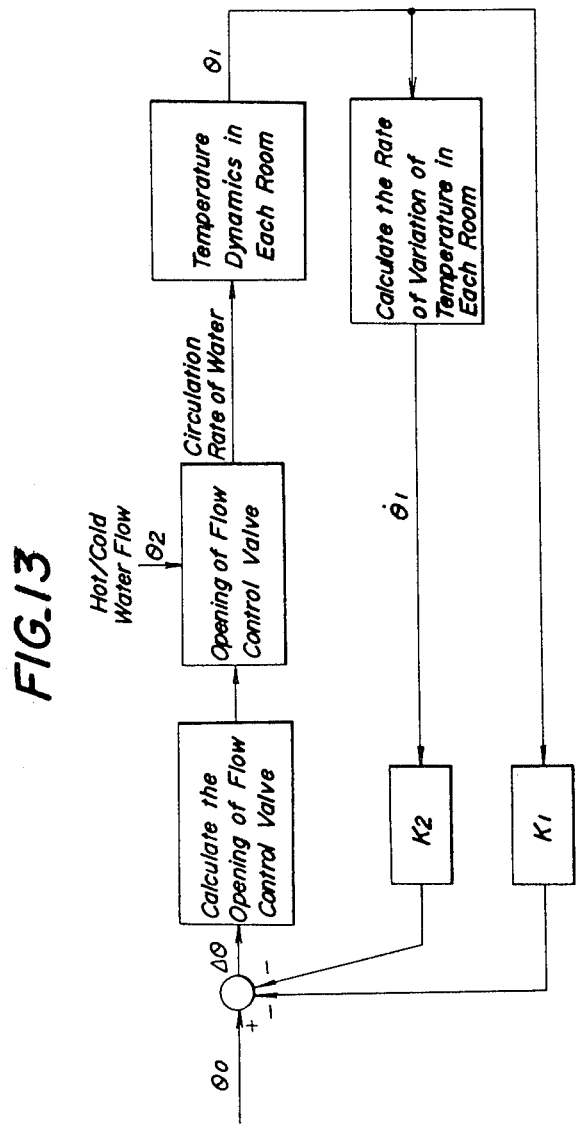
FIG. 13 is a block diagram showing an example of closed loop indoor temperature control.

The indoor heat distribution and absorption control is explained now with reference to FIGS. 5, 6 and 13. The necessity of air conditioning for a particular room is dictated by the manual switch 99 located in that room, so that the solenoid valve is either switched on or off. When the switch 99 is turned on, the two step temperature control, i.e., an initial setting and a steady state regulation, are performed to bring the room temperature $\theta_1$ so as to coincide with a desired temperature $\theta_0$ preset by the room temperature indicator 98.

During a predetermined time interval from an instant that the manual switch 99 is on, the opening of the flow control valve 79, located in each room, is determined in the following manner. An initial opening $y_3$ of the flow control valve 79 is determined by the following function based on a desired temperature $\theta_0$ of the room temperature indicator 98, a present room temperature $\theta_1$, and a water temperature $\theta_2$ of the water in the storage tank 38:

$$y_3 = f(\theta_0, \theta_1, \theta_2) \tag{25}$$

The functional relation given by equation (25) is stored in the ROM 130, to be referred to for necessary computation performed on the data by the microprocessor 126.

The steady state regulation, after the initial setting, is performed as shown in the block diagram of FIG. 13. This closed loop control has the same sampling period as that of the minor cycle previously described. The microprocessor 126 in the control unit 110 performs the arithmetic operation shown in FIG. 13.

The present room temperature $\theta_1$ is measured by the room temperature sensor 96. The rate of variation $\dot\theta_1$ of the present room temperature $\theta_1$ is calculated by the microprocessor 126 from the past and present room temperatures. The past previous room temperatures measured by the room temperature sensor 96 are stored temporarily in the RAM 128 of the control unit 110.

The present room temperature $\theta_1$ and the rate of variation $\dot\theta_1$ are respectively multiplied by the gains $K_1$ and $K_2$, and then added together. The result of the addition is in turn subtracted from the desired room temperature $\theta_0$ to obtain a temperature error $\Delta\theta$. Based upon this resultant error $\Delta\theta$, the opening $y_3$ of the flow control valve 79 is calculated as a function of $\Delta\theta$. The above process can be expressed by the following equations:

$$\Delta\theta = \theta_0 - (K_1\theta_1 + K_2\dot\theta) \tag{26}$$

$$y_3 = f(\Delta\theta) \tag{27}$$

These calculations are performed by the microprocessor 126. There can exist a variable heat gradient $\Delta t$ between the desired temperature $\theta_0$ set by the room temperature indicator 98 and the water temperature $\theta_2$ of water in the storage tank 38. Namely, $$\Delta t = \theta_0 - \theta_2 \tag{28}$$

It is desirable for the room temperature to follow the desired temperature as soon as possible irrespective of the heat gradient. For this purpose, the gains $K_1$ and $K_2$ are stored in the ROM 130 as a table lookup of which magnitudes are varied continuously as a function of the heat gradient $\Delta t$.

The opening $y_3$ of the flow control valve 79 is transformed into an appropriate signal form which is supplied to the pulse generator 180 via the I/O port 124. The output of the pulse generator 180 is supplied to the stepping motor 106 to control the opening of the flow control valve 79.

While the circulation rate of the water flow passing through the variable speed circulation pump 42 varies depending upon the air conditioning demand of each room, the outlet pressure of the variable speed circulation pump 42, which is measured by the variable speed circulation pump pressure transducer 42, is kept approximately constant by controlling the rotational speed of the variable speed induction motor 104 via the pulse width modulator 160 and the thyristors 164. The rectifier 162 converts the line voltage into a direct current to be supplied to the thyristors 164.

The following advantageous effects can be achieved by a heat pump air conditioning system according to the present invention.

(1) The coefficient of performance is greatly improved by controlling the rotational speed of the compressor and opening of the expansion valve so as to follow an ideal refrigeration cycle.

(2) The coefficient of performance is further improved compared to a prior art heat pump air conditioning system by installing a solar collector and an outdoor heat exchanger in parallel so that their use is switched in a manner to utilize additional solar heat energy or nocturnal radiation energy, and then by controlling the rotational speed of the compressor and the opening of the expansion valve so as to follow an ideal refrigeration cycle.

(3) The solar collector and the heat pump air conditioning system are integrally assembled, so that a heat exchanger and a circulation pump which are otherwise necessary to connect the two components in a prior art solar assisted heat pump air conditioning system are not required to realize the present system.

(4) The size of the system is small and the components of the existing heat pump air conditioning system and solar thermal heating system can be utilized as is or with minor modifications. Therefore, the initial investment cost for the system is minimal.

(5) It is not necessary to design an air conditioning system based on the peak heat load, because the system has the storage tank. The peak heat load during winter time can also be overcome by overdriving the variable speed compressor by a slight amount. This fact, coupled with the advantage of using latent heat, causes the total system to be small-sized.

(6) Since Freon is used as the refrigerant, the freezing temperature of the refrigerant is low, so that there is no freezing problem as in the case of the hydronic system which often destructs the heat exchanger and pipings.

(7) No discomfort problems exist with frosting, since the heat pump is arranged on the upstream side of the water storage tank.

(8) The system is applicable to the case where the temperature difference of indoor and outdoor environments is large, by either preheating the outdoor heat exchanger using the water in the storage tank, installing a heat pump with a variable speed compressor on the downstream side of the water storage tank, or a combination thereof.

(9) Since the heat collecting temperature of the refrigerant in the solar collector can be set considerably lower compared with the prior art solar assisted heat pump system, the heat transfer from the ambient atmosphere can be utilized in some cases in addition to the solar radiation.

(10) An amount of heat collected per unit weight of the refrigerant is very large, because the present system utilizes the latent heat of the refrigerant, while the prior art solar assisted heat pump system uses the sensible heat. Also there is little heat loss along the pipings because of low temperature. Therefore, very efficient heat collection can be realized even though the solar collector is small in size and simple in construction.

(11) The solar collector is converted into a heat dissipator during summer night time. In this case, high efficiency heat dissipation can be realized, since the condensing temperature of the refrigerant can be lowered because of the colder temperature of the solar collector board.

(12) Night sky cooling can use lower off-peak electric rates during night time.

(13) There exist further energy saving measures, since each heat exchanger in each room can be individually operated in response to the heat demand of the individual room.

(14) The air conditioning of each room is made by linear control of the flow control valve to follow a preset temperature of each room. Therefore, there is no temperature cycling as in the conventional on-off control system, and consequently the system provides comfort to persons in the room.

Obviously, numerous modifications and variations of the present invention are possible in light of the above teachings. It is therefore to be understood that within the scope of the appended claims, the invention may be practiced otherwise than as specifically described herein.

What is claimed is:

1. A heat pump air conditioning system, comprising:
   a refrigeration cycle having a compressor for compressing a refrigerant, means for exchanging heat including an evaporator for evaporating said refrigerant and a condenser for condensing said refrigerant, and an expansion valve for controlling passage of said refrigerant;
   first means for measuring an ambient temperature;
   second means for measuring a temperature of said refrigerant;
   third means for measuring a pressure of said refrigerant; and
   controlling means receiving the measured data of said ambient temperature, said temperature of said refrigerant and said pressure of said refrigerant for controlling a rotational speed of said compressor and an opening of said expansion valve in accordance with said measured data to maximize a coefficient of performance of said refrigeration cycle.

2. A heat pump air conditioning system as claimed in claim 1, wherein said controlling means comprises:
   an analog multiplexer for sampling said measured data from said first, second and third means to obtain appropriate analog signals;
   means for holding said appropriate analog signals to obtain sample-held analog signals;
   means for converting said sample-held analog signals into digital signals;
   means for generating a rotational speed signal from said digital signals to control said rotational speed of said compressor; and
   means for generating an opening signal from said digital signals to control the opening of said expansion valve.

3. A heat pump air conditioning system as claimed in claim 2, further comprising a variable speed induction motor for driving said compressor and having stator windings wherein said means for generating said rotational speed signal further comprises means for producing a modulation signal with a variable repetition rate and a variable pulse width from said rotational speed signal, so that said modulation signal is applied to said stator windings of said variable speed induction motor for driving said compressor to control said rotational speed of said compressor.

4. A heat pump air conditioning system as claimed in claim 3, wherein said means for producing a modulation signal further comprises means for producing thyristor chopping.

5. A heat pump air conditioning system as claimed in claim 2, wherein said means for generating said opening signal further comprises means for producing an expansion valve opening signal with a variable number of pulses, so that said expansion valve opening signal is supplied to a stepping motor for controlling said opening of said expansion valve.

6. A heat pump air conditioning system as claimed in claim 5, wherein said controlling means further comprises a pulse generator for producing said pulses.

7. A heat pump air conditioning system as claimed in claim 1, wherein said controlling means further comprises means for controlling said rotational speed of said compressor and said opening of said expansion valve under open loop control and closed loop control.

8. A heat pump air conditioning system as claimed in claim 7, further comprising:
   first table lookup means for storing predetermined rotational speeds of said compressor and openings of said expansion valve as functions of a measured temperature difference between a water temperature of a storage tank and said ambient temperature, and a heat rejection or absorption rate of said storage tank determined by said water temperature and said ambient temperature or said equivalent ambient temperature; P1 means for calculating a rotational speed of said compressor and an opening of said expansion valve from a measured temperature difference between said water temperature of said storage tank and said ambient temperature and a measured heat rejection or absorption rate of said storage tank, by referring to said first table lookup means to perform said open loop control of said rotational speed of said compressor and said opening of said expansion valve;
   second table lookup means for storing predetermined corrections of said rotational speeds of said compressor and said openings of said expansion valve as functions of predetermined deviations of degrees of superheating and subcooling of said refrigerant from those of an ideal refrigeration cycle; and
   means for calculating corrections of a rotational speed of said compressor and an opening of said expansion valve from measured degrees of superheating and subcooling of said refrigerant, by referring to said second table lookup means to perform said closed loop control to finely adjust said rotational speed of said compressor and said opening of said expansion valve.

9. A heat pump air conditioning system, comprising:
   a refrigeration cycle which further comprises:
   an outdoor heat exchanger installed outdoors for exchanging heat via refrigerant;

a solar collector coupled in parallel with said outdoor heat exchanger for collecting solar energy;

means for selecting one of said outdoor heat exchanger and said solar collector at a time for heat transfer between said refrigerant and outdoor ambient air and/or heat radiating objects;

a compressor coupled to said outdoor heat exchanger and said solar collector for compressing said refrigerant;

an expansion valve coupled to said outdoor heat exchanger and said solar collector for controlling a flow rate of said refrigerant; and a storage tank having at least one of an indoor heat exchanger installed indoors and a storage tank heat exchanger disposed therein, each of which acts as a condenser when said outdoor heat exchanger or said solar collector is used as an evaporator and acts as an evaporator when said outdoor heat exchanger or said solar collector is used as a condenser, for transferring heat between said refrigerant and indoor and outdoor air and between said refrigerant and the water in said storage tank, respectively;

first means disposed in said outdoor heat exchanger for measuring an ambient temperature;

second means for measuring a temperature of said refrigerant;

third means for measuring a pressure of said refrigerant;

fourth means disposed in said solar collector for measuring an equivalent ambient temperature; and controlling means receiving the measured data of said ambient temperature, said temperature of said refrigerant and said pressure of said refrigerant for controlling a rotational speed of said compressor and an opening of said expansion valve in accordance with said measured data to maximize a coefficient of performance of said refrigeration cycle.

10. A heat pump air conditioning system as claimed in claim 9, wherein said storage tank further comprises means for storing the water performing the heat exchange with said refrigerant in said storage tank heat exchanger.

11. A heat pump air conditioning system as claimed in claim 9, wherein said controlling means further comprises:

an analog multiplexer for sampling said measured data from said first, second and third means to obtain appropriate analog signals;

means for holding said appropriate analog signals to obtain sample-held analog signals;

means for converting said sample-held analog signals into digital signals;

means for generating a rotational speed signal from said digital signals to control said rotational speed of said compressor; and means for generating an opening signal from said digital signals to control the opening of said expansion valve.

12. A heat pump air conditioning system as claimed in claim 11, wherein said means for generating said rotational speed signal further comprises means for producing a modulation signal with a variable repetition rate and a variable pulse width from said rotational speed signal, so that said modulation signal is applied to the stator windings of a variable speed induction motor for driving said compressor to control said rotational speed of said compressor.

13. A heat pump air conditioning system as claimed in claim 12, wherein said means for producing a modulation signal further comprises means for producing thyristor chopping.

14. A heat pump air conditioning system as claimed in claim 11, wherein said means for generating said opening signal further comprises means for producing an expansion valve opening signal with a variable number of pulses, so that said expansion valve opening signal is supplied to a stepping motor for controlling said opening of said expansion valve.

15. A heat pump air conditioning system as claimed in claim 14, wherein said controlling means further comprises a pulse generator for producing said pulses.

16. A heat pump air conditioning system as claimed in claim 9, wherein said controlling means further comprises means for controlling rotational speed of said compressor and said opening of said expansion valve under open loop control and closed loop control.

17. A heat pump air conditioning system as claimed in claim 16, further comprising:

first table lookup means for storing predetermined rotational speeds of said compressor and openings of said expansion valve as functions of a measured temperature difference between said water temperature of said storage tank and said ambient temperature or an equivalent ambient temperature which is measured by a temperature sensor, in said solar collector, and a heat rejection or absorption rate of said storage tank determined by said water temperature and said ambient temperature or said equivalent ambient temperature;

means for calculating a rotational speed of said compressor and an opening of said expansion valve from a measured temperature difference between said water temperature of said storage tank and said ambient temperature or an equivalent ambient temperature and a measured heat rejection or absorption rate of said storage tank, by referring to said first table lookup means to perform said open loop control of said rotational speed of said compressor and said opening of said expansion valve;

second table lookup means for storing predetermined corrections of said rotational speeds of said compressor and said openings of said expansion valve as functions of predetermined deviations of degrees of superheating and subcooling of said refrigerant from those of an ideal refrigeration cycle; and means for calculating corrections of a rotational speed of said compressor and an opening of said expansion valve from measured degrees of superheating and subcooling of said refrigerant, by referring to said second table lookup means to perform said closed loop control to finely adjust said rotational speed of said compressor and said opening of said expansion valve.

18. A heat pump air conditioning system, comprising:

an outdoor heat exchanger installed outdoors for exchanging heat via refrigerant;

a solar collector coupled in parallel with said outdoor heat exchanger for collecting solar energy;

means for selecting one of said outdoor heat exchanger and said solar collector at a time for heat transfer between said refrigerant and outdoor ambient air and/or heat radiating objects;

a compressor coupled to said outdoor heat exchanger and said solar collector for compressing said refrigerant;

an expansion valve coupled to said outdoor heat exchanger and said solar collector for controlling a flow rate of said refrigerant;

a storage tank heat exchanger disposed in a storage tank which acts as a condenser when said outdoor heat exchanger or said solar collector is used as an evaporator and acts as an evaporator when said outdoor heat exchanger or said solar collector is used as a condenser, for transferring heat between said refrigerant and the water in said storage tank, said storage tank storing the water performed the heat exchange with said refrigerant in said storage tank heat exchanger;

first means disposed in said outdoor heat exchanger for measuring an ambient temperature;

second means for measuring a temperature of said refrigerant;

third means for measuring a pressure of said refrigerant;

fourth means disposed in said solar collector for measuring an equivalent ambient temperature;

controlling means receiving the measured data of said ambient temperature, said temperature of said refrigerant and said pressure of said refrigerant for controlling a rotational speed of said compressor and an opening of said expansion valve in accordance with said measured data to maximize a coefficient of performance of said refrigeration cycle;

a variable speed circulation pump for delivering said water at a constant pressure;

a solenoid valve arranged indoors for interrupting flow of water or allowing passing of the water flow from said variable speed circulation pump;

a flow control valve for regulating the circulation rate of said water flow;

an indoor heat exchanger for performing heat transfer between the indoor air and said water flow; and means for controlling said variable speed circulation pump, said solenoid valve, and said flow control valve in response to an indoor heat demand to introduce an appropriate amount of said water flow into said indoor heat exchanger.

19. A heat pump air conditioning system as claimed in claim 18, wherein said controlling means further comprises:

an analog multiplexer for sampling said measured data from said first, second and third means to obtain appropriate analog signals;

means for holding said appropriate analog signals to obtain sample-held analog signals;

means for converting said sample-held analog signals into digital signals;

means for generating a rotational speed signal from said digital signals to control said rotational speed of said compressor; and means for generating an opening signal from said digital signals to control the opening of said expansion valve.

20. A heat pump air conditioning system as claimed in claim 19, wherein said means for generating said rotational speed signal further comprises means for producing a modulation signal with a variable repetition rate and a variable pulse width from said rotational speed signal, so that said modulation signal is applied to the stator windings of a variable speed induction motor for driving said compressor to control said rotational speed of said compressor.

21. A heat pump air conditioning system as claimed in claim 20, wherein said means for producing a modulation signal further comprises means for producing thyristor chopping.

22. A heat pump air conditioning system as claimed in claim 19, wherein said means for generating said opening signal further comprises means for producing an expansion valve opening signal with a variable number of pulses, so that said expansion valve opening signal is supplied to a stepping motor for controlling said opening of said expansion valve.

23. A heat pump air conditioning system as claimed in claim 22, wherein said controlling means further comprises a pulse generator for producing said pulses.

24. A heat pump air conditioning system as claimed in claim 19, further comprising a variable speed induction motor for driving said compressor and having stator windings wherein said means for generating said rotational speed signal further comprises means for producing a modulation signal with a variable repetition rate and a variable pulse width in response to said rotational speed signal, so that said modulation signal is applied to said stator windings of said variable speed induction motor for driving said circulation pump to control said rotational speed of said circulation pump.

25. A heat pump air conditioning system as claimed in claim 24, wherein said means for producing a modulation signal further comprises means for producing thyristor chopping.

26. A heat pump air conditioning system as claimed in claim 19, wherein said means for generating said opening signal further comprises means for producing a flow control valve opening signal with a variable number of pulses, so that said flow control valve opening signal is supplied to a stepping motor for controlling said opening of said flow control valve.

27. A heat pump air conditioning system as claimed in claim 26, wherein said controlling means further comprises a pulse generator for producing said pulses.

28. A heat pump air conditioning system as claimed in claim 18, wherein said controlling means further comprises means for controlling rotational speed of said compressor and said opening of said expansion valve under open loop control and closed loop control.

29. A heat pump air conditioning system as claimed in claim 28, further comprising:

first table lookup means for storing predetermined rotational speeds of said compressor and openings of said expansion valve as functions of a measured temperature difference between said water temperature of said storage tank and said ambient temperature or an equivalent ambient temperature which is measured by a temperature sensor, in said solar collector, and a heat rejection or absorption rate of said storage tank determined by said water temperature and said ambient temperature or said equivalent ambient temperature;

means for calculating a rotational speed of said compressor and an opening of said expansion valve from a measured temperature difference between said water temperature of said storage tank and said ambient temperature or an equivalent ambient temperature and a measured heat rejection or absorption rate of said storage tank, by referring to said first table lookup means to perform said open loop control of said rotational speed of said compressor and said opening of said expansion valve;

second table lookup means for storing predetermined corrections of said rotational speeds of said compressor and said openings of said expansion valve as functions of predetermined deviations of degrees of superheating and subcooling of said refrigerant from those of an ideal refrigeration cycle; and means for calculating corrections of a rotational speed of said compressor and an opening of said expansion valve from measured degrees of superheating and subcooling of said refrigerant, by referring to said second table lookup means to perform said closed loop control to finely adjust said rotational speed of said compressor and said opening of said expansion valve.

30. A heat pump air conditioning system as claimed in claim 18, wherein the regulation of said water flow rate of said water flow into said indoor heat exchanger is performed by a closed loop control of said flow control valve, in response to the temperature difference between said preset indoor temperature and the measured indoor temperature and a rate of variation of said measured indoor temperature.

31. A heat pump air conditioning system as claimed in claim 30, further comprising:

third table lookup means for storing predetermined openings of said flow control valve as functions of water temperatures of said storage tank and predetermined indoor temperatures; and means for calculating an opening of said flow control valve from measured water temperature of said storage tank and a preset indoor temperature, by referring to said third table lookup means to regulate a water flow rate of the water flow into said indoor heat exchanger.

* * * * *